(12) United States Patent
Doria et al.

(10) Patent No.: US 10,066,946 B2
(45) Date of Patent: Sep. 4, 2018

(54) AUTOMATIC LOCALIZATION GEOMETRY DETECTION

(71) Applicant: HERE Global B.V., Eindhoven (NL)

(72) Inventors: David Doria, Oak Park, IL (US); Xin Chen, Evanston, IL (US)

(73) Assignee: HERE Global B.V., Eindhoven (NL)

( * ) Notice: Subject to any disclaimer, the term of this patent is extended or adjusted under 35 U.S.C. 154(b) by 156 days.

(21) Appl. No.: 15/248,714

(22) Filed: Aug. 26, 2016

(65) Prior Publication Data

US 2018/0058861 A1 Mar. 1, 2018

(51) Int. Cl.
- *G01C 21/32* (2006.01)
- *G06T 17/05* (2011.01)
- *G01S 17/89* (2006.01)
- *G01S 7/48* (2006.01)
- *G06T 7/00* (2017.01)

(52) U.S. Cl.
CPC ............ *G01C 21/32* (2013.01); *G01S 7/4808* (2013.01); *G01S 17/89* (2013.01); *G06T 7/00* (2013.01); *G06T 17/05* (2013.01); *G06T 2215/16* (2013.01)

(58) Field of Classification Search
CPC ........ G01C 21/32; G01C 21/30; G06T 17/05; G06T 2215/16; G01S 17/89
See application file for complete search history.

(56) References Cited

U.S. PATENT DOCUMENTS

| | | | |
|---|---|---|---|
| 9,046,600 | B2 | 6/2015 | James |
| 9,285,230 | B1 | 3/2016 | Silver et al. |
| 2006/0178828 | A1* | 8/2006 | Moravec ............ G05D 1/0251 345/424 |
| 2007/0076920 | A1 | 4/2007 | Ofek |
| 2010/0207936 | A1 | 8/2010 | Minear et al. |
| 2011/0279452 | A1 | 11/2011 | Ibe et al. |
| 2012/0310516 | A1 | 12/2012 | Zeng |

(Continued)

FOREIGN PATENT DOCUMENTS

DE 102007007540 A1 8/2008

OTHER PUBLICATIONS

Hata, Alberto, and Denis Wolf. "Road marking detection using LIDAR reflective intensity data and its application to vehicle localization." 17th International IEEE Conference on Intelligent Transportation Systems (ITSC). IEEE, 2014.

(Continued)

*Primary Examiner* — Dale Moyer
(74) *Attorney, Agent, or Firm* — Lempia Summerfield Katz LLC

(57) ABSTRACT

Embodiments include apparatus and methods for generating a localization geometry or occupancy grid for a geographic location. Point cloud that describes a vicinity of a pathway is collected by a distance sensor and describing a vicinity of the pathway. The point cloud data is reduced or filtered to a predetermined volume with respect to the roadway. The remaining point cloud data is projected onto a two-dimensional plane including at least one pixel formation. A volumetric grid is defined according to the at least one pixel formation, and a voxel occupancy for each of a voxels forming the volumetric grid is determined. The arrangement of the voxel occupancies or a sequence of data describing the voxel occupancies is a localization geometry that describes the geographic location of the pathway.

20 Claims, 20 Drawing Sheets

(56) References Cited

U.S. PATENT DOCUMENTS

2013/0169685 A1    7/2013  Lynch
2015/0293216 A1*  10/2015  O'Dea ................. B60W 30/12
                                                         701/23
2017/0116781 A1*   4/2017  Babahajiani ............ G06T 17/20
2017/0270361 A1*   9/2017  Puttagunta ......... G06K 9/00664

OTHER PUBLICATIONS

Zhao, Gangqiang, and Junsong Yuan. "Curb detection and tracking using 3D-LIDAR scanner." 2012 19th IEEE International Conference on Image Processing. IEEE, 2012.

Levinson, Jesse, and Sebastian Thrun. "Robust vehicle localization in urban environments using probabilistic maps." Robotics and Automation (ICRA), 2010 IEEE International Conference on. IEEE, 2010.

Chen, Xin et al. "Next generation map making: geo-referenced ground-level LIDAR point clouds for automatic retro-effective road feature extraction." Proceedings of the 17th ACM SIGSPATIAL International Conference on Advances in Geographic Information Systems. ACM, 2009.

European Search Report for corresponding Application No. 17187282.3-1206, dated Feb. 1, 2018.

* cited by examiner

500A

| 0 | 1 | 1 |
|---|---|---|
| 0 | 1 | 1 |
| 0 | 0 | 0 | z=1

500B

| 1 | 1 | 0 |
|---|---|---|
| 1 | 1 | 0 |
| 1 | 1 | 0 | z=2

500C

| 0 | 0 | 0 |
|---|---|---|
| 0 | 1 | 0 |
| 0 | 0 | 1 | z=3

FIG. 20

AUTOMATIC LOCALIZATION GEOMETRY DETECTION

FIELD

The following disclosure relates to detection of a vicinity of a roadway and generation of an occupancy grid for a signature of the vicinity of the roadway, and in addition, applications for the signature of the vicinity of the roadway.

BACKGROUND

The Global Positioning System (GPS) or another global navigation satellite system (GNSS) provides location information to a receiving device anywhere on Earth as long as the device has a substantial line of sight without significant obstruction to three or four satellites of the system. The GPS system is maintained and made available by the United States government. Originally, the government retained exclusive use of GPS. Over time increasing levels of accuracy of the GPS signals were made available to the public.

Accuracy of the GPS system alone is about 50 feet or 15 meters. The accuracy may be augmented using secondary techniques or systems such as the Wide Area Augmentation System (WAAS), Differential GPS (DGPS), inertial navigation systems (INS) and Assisted GPS. WAAS and DGPS improve accuracy using ground stations that transmit position information. INS utilizes internal sensors at the receiving device for improving the accuracy of GPS.

However, some applications require greater accuracies obtainable with GPS, even with enhanced accuracy techniques. For example, in high definition mapping and navigating application, the receiving device may be placed on a map in a three-dimensional view with greater accuracy than that obtainable from GPS techniques. Localization techniques that match a location to a map or environment face additional challenging in improving this accuracy.

SUMMARY

In one embodiment, a method for automatic generation of a localization geometry includes receiving point cloud data collected by a distance sensor and describing a vicinity of a pathway, reducing the point cloud data to a predetermined volume with respect to the pathway, projecting the point cloud data to a two-dimensional plane including at least one pixel formation, defining a volumetric grid according to the at least one pixel formation, determining a voxel occupancy for each of a plurality of voxels forming the volumetric grid, and generating the localization geometry according to the voxel occupancy.

In another embodiment an an apparatus for automatic generation of a localization geometry of a roadway includes a communication interface configured to receive point cloud data collected by a distance sensor and describing a vicinity of a roadway and a controller configured to reduce the point cloud data to a predetermined volume with respect to the roadway, project the point cloud data to a two-dimensional plane including at least one pixel formation, and determine a voxel occupancy for each of a plurality of voxels corresponding to the at least one pixel formation. The voxel occupancy for a grid defines the localization geometry of the roadway.

In another embodiment, a system for automatic generation of a localization geometry of a roadway includes a distance sensor configured to receive point cloud data collected by a distance sensor and describing a vicinity of a roadway, and a controller configured to reduce the point cloud data to a predetermined volume with respect to the roadway and project the point cloud data to a two-dimensional plane including at least one pixel formation. The localization geometry includes a volumetric grid is populated according to a voxel occupancy value for at least one pixel formation.

BRIEF DESCRIPTION OF THE DRAWINGS

Exemplary embodiments of the present invention are described herein with reference to the following drawings.

FIG. 20 illustrates data entries for voxels for a signature of a geographic area.

DETAILED DESCRIPTION

Example applications that utilize location data and benefit from increases in positional accuracy include localization applications, three-dimensional applications, and building modeling applications. Localization applications may include a category of applications that match a set of observed data collected at a location to a known model of the surroundings. For example, the surroundings at any point may provide a signature of the location. Three-dimensional applications may include any application that provides a three-dimensional model and places a location with that model. Example three-dimensional applications include augmented reality, 3D navigation, and 3D mapping. Building modeling applications may include models of buildings, indoor environments, or architecture that are matched with a detected location.

The following embodiments provide improvements for positional accuracy using a set of sensor data augmented by an occupancy grid. Two-dimensional images or other data may be arranged in pixels. Pixels may include image characteristics such as colors, brightness, hue, or luminance and may be associated with other non-image data. Pixels may form bitmaps with each pixel making up a set area in the bitmap. Likewise, three-dimensional data may be arranged in voxels, which each represent a set volume in the three-dimensional data. The set volumes may form a grid making up the three-dimensional space. In one example, the voxels include the positional location of the voxel and data for whether or not the voxel is occupied. In another example, the voxel data includes the position within the voxel for objects within the voxel. Alternatively, the voxels may not be encoded with relative position in the grid. The voxels may be ordered in a logical sequence in which the sequence conveys the relative position in the grid.

The following embodiments reduce the amount of computing and networking resources required to represent the grid of the three-dimensional space and communicate features of the space using the grid. Voxels for a three-dimensional space require a vast amount of storage space and bandwidth in order to be communicated in a mobile system. The following embodiments include voxels may be arranged in an occupancy grid that includes voxels for only certain voxel locations or groups of voxel locations. Only significant voxels may be stored or communicated. Thus, storage requirements and/or bandwidth requirement are reduced. Techniques for selecting significant voxels are applied to the three-dimensional space in order to generate an occupancy grid comprising significant voxels.

Figure 1:
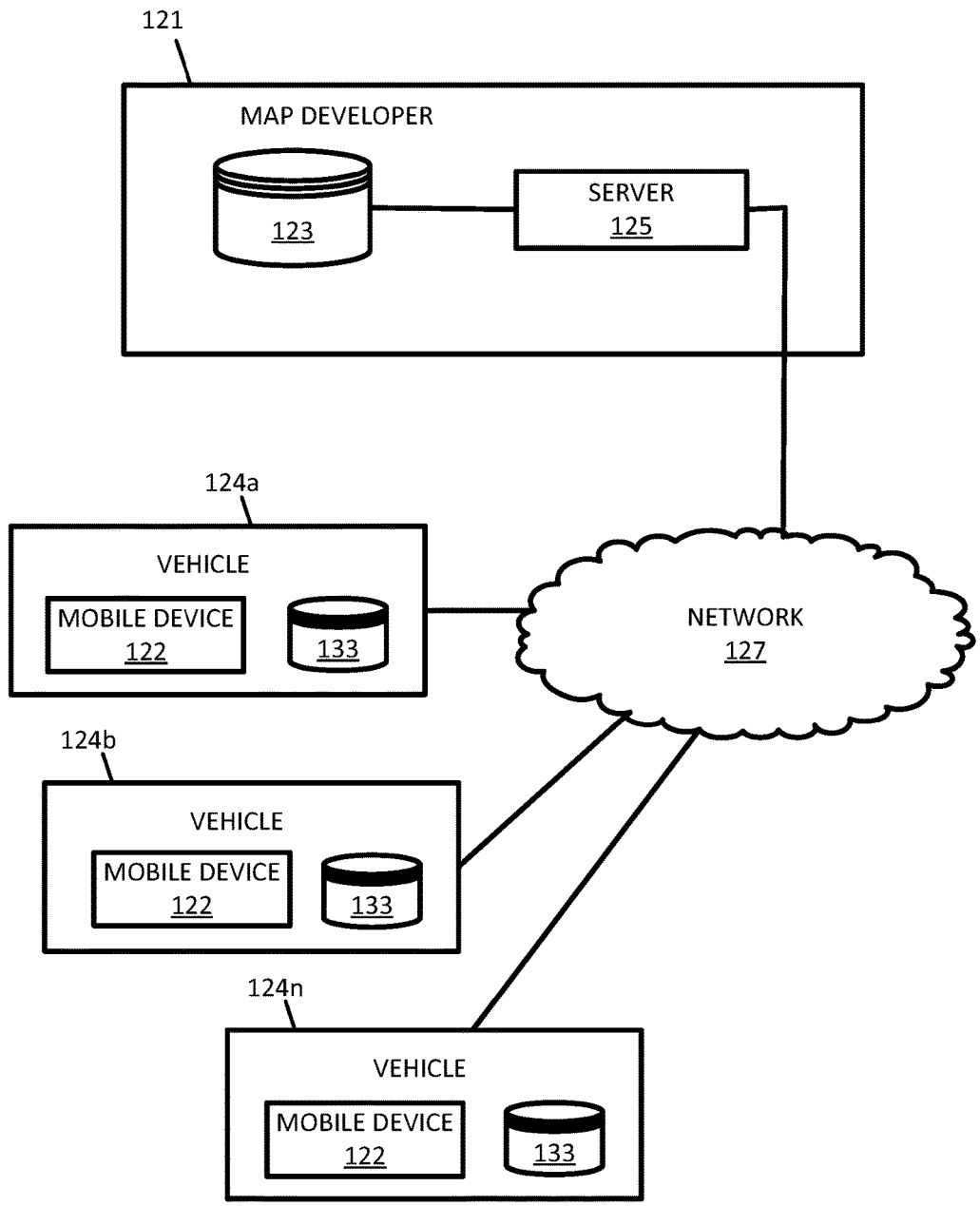
FIG. 1 illustrates an example system for generating and implementing an occupancy grid.

FIG. 1 illustrates an example system for generating and implementing an occupancy grid. In FIG. 1, one or more vehicles 124a, 124b, . . . 124n are connected to the server 125 though the network 127. The vehicles 124a-n may be directly connected to the server 125 or through an associated mobile device 122. A map developer system 121, including the server 125 and a geographic database 123, exchanges (e.g., receives and sends) data from the vehicles 124a-n. The mobile devices 122 include databases 133 corresponding to a local map, which may be modified according to the server 125. The mobile device 124a-n may be standalone device such as smartphones or devices integrated with vehicles. Additional, different, or fewer components may be included.

One of the vehicles 124 may be a collection vehicle, which is discussed in more detail below with respect to FIG. 15. The collection vehicle may include one or more distance data collection device or sensor, such as a light detection and ranging (LiDAR) device. The distance data collection sensor may generate point cloud data. The distance data collection sensor may include a laser range finder that rotates a mirror directing a laser to the surroundings or vicinity of the collection vehicle on a roadway or another collection device on any type of pathway. Other types of pathways may be substituted for the roadway in any embodiment described herein.

The mobile device 122 and/or the server 125 receives point cloud data collected by the distance sensor and describing the vicinity of the roadway. The point cloud is formed of points or pixels, each of which may include an intensity and location data. The location data may be a three component coordinate (e.g., [x, y, z]) or a direction and a distance. The direction may be defined as a first angle from a two reference planes (e.g., [alpha, beta, distance]). The reference planes may be a horizontal plane parallel to the surface of the Earth and a vertical plane perpendicular to the surface of the Earth.

The mobile device 122 and/or the server 125 the point cloud data to a predetermined volume with respect to the roadway. The predetermined volume may be the dimensions of a rectangular prism (e.g., 10 meters by 10 meters by 10 meters). The predetermined volume may be another shape such as a cylindrical prism. The predetermined volume may be achieved by filtering data in the point cloud. The point cloud may be reduced by a threshold distance in each dimension.

The mobile device 122 and/or the server 125 projects the point cloud data to a two-dimensional plane including at least one pixel formation. The projection of point cloud data to the two-dimensional plane may include construction of a line from each point in the point cloud data to the two-dimensional plane and perpendicular to the two-dimensional plane. When the two-dimensional plane is parallel to a reference plane in the coordinate system of the point cloud data, the projection of point cloud data to the two-dimensional may include dropping one of the coordinates of the point cloud data. For example, when the two-dimensional plane is at z=0, the point (x, y, z) is projected to the two-dimensional plane at (x, y).

The mobile device 122 and/or the server 125 generates a volumetric grid according to the at least one pixel formation. The at least one pixel formation is an arrangement of data points in the two-dimensional plane that are projected from the point cloud. The pixel formation may include at least a threshold number of data points within a predetermined area. The predetermined area may be a cell. Example threshold quantities include 10 data points, 100 data points or 1000 data points. In an alternative to predetermined cells, the pixel formation may be defined according to the relative distance between points. For example, for any two points, the points may be considered in the same pixel formation when the two points are adjacent to one another. Two pixels are adjacent when the distance between the two points are less than a threshold distance. Adjacent pixels are grouped together as a pixel formation until empty space in all direction exceeds the threshold distance.

After defining the one or more pixel formations, corresponding voxels, or volumetric voxels, are constructed by extending the pixel formations into the grid. For each pixel formation, having an area of any shape, a three-dimensional volume having the shape as a cross-section is constructed. For example, a circle in the two-dimensional plane is extended into a cylinder in the volumetric grid. A square is extended into a rectangular prism. In another example, the pixel formation is extended by approximating the three-dimensional shape using voxels of a defined shape. For example, each voxel that fits completely within the extended volumetric grid is included. In another example, voxels of which at least half intersect the extended volumetric grid are included.

The mobile device 122 and/or the server 125 determines a voxel occupancy for each of a plurality of voxels forming the volumetric grid. The voxel occupancy may be a binary indication (e.g., 1 or 0, on or off) that the voxel has been included to represent the pixel formation extended from the two-dimensional plane. All voxels perpendicular to the two-dimensional plane at any height or distance from the one or more pixel formations are voxels that are included. The voxel occupancy may be a binary indication of whether or data is included in the voxel. Data is included in the voxel when the voxel corresponds to point cloud data and that voxel is included to represent the pixel formation.

The mobile device 122 and/or the server 125 generates the localization geometry according to the voxel occupancy. In one example, the localization geometry includes each voxel that has been included to represent the pixel formation and the relative locations of those voxels. In one example, the localization geometry includes the type or shape of data in the voxels. The localization geometry may server as a signature for the geographic location represented by the voxels.

Consider an example of a volume defined by nine cells on any plane and 27 cells total, including a length of three cells, a width of three cells, and a height of three cells, as represented by the tables 500A, 500B, and 500 C in FIG. 20. Each of the nine cells, at some height includes data in the point cloud, which is why a volumetric grid extended from the two-dimensional plane includes the nine cells. The representation of tables 500A, 500B, and 500C includes a 1 in voxels that included data at the corresponding height (e.g., $z=1$, $z=2$, or $z=3$). Together, the 27 data entries or voxels, which may be arranged in a vector or an array of data provide a signature for the geographic area from which the point cloud is collected.

Figure 2:
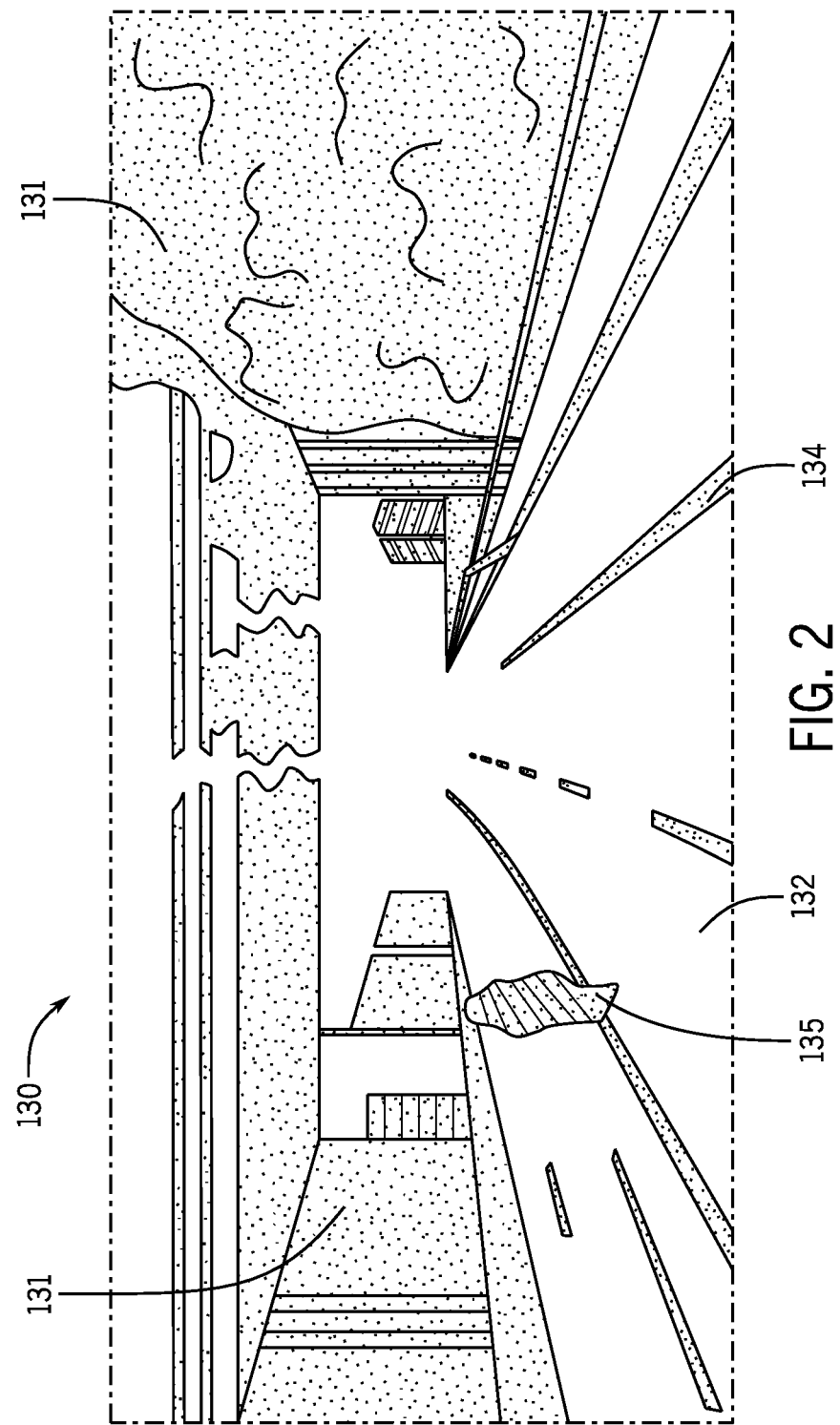
FIG. 2 illustrates an example point cloud for a roadway.

FIG. 2 illustrates an example point cloud 130 for a roadway. The point cloud 130 may be collected by LiDAR, structured light, or stereo cameras. The point cloud 130 may be collected from the roadway 132 by a collection vehicle, which may be autonomous. Alternatively, the point cloud 130 is an aerial point cloud collected from an aerial vehicle. The aerial vehicle may be an airplane or a drone. In another example, the point cloud 130 is collected from an orbiting vehicle such as a satellite. Structured light may include a projection of a predetermined pattern in the vicinity of the collection vehicle. The deformation of the predetermined pattern, which is collected by an image capture device, may be analyzed to determine the position and objects in the vicinity of the collection vehicle.

Portions of the point cloud 130 may represent various objects. Distant objects 131 may include trees, walls, sound barriers, or other objects. One or more transient objects 135 may include other vehicles, pedestrians, or any type of object that is not present over time at the location. In addition, surface markings 134 may be prominent in the point cloud due to the reflective or retroreflective paint used to paint lane markers on the road surface 132.

Figure 3:
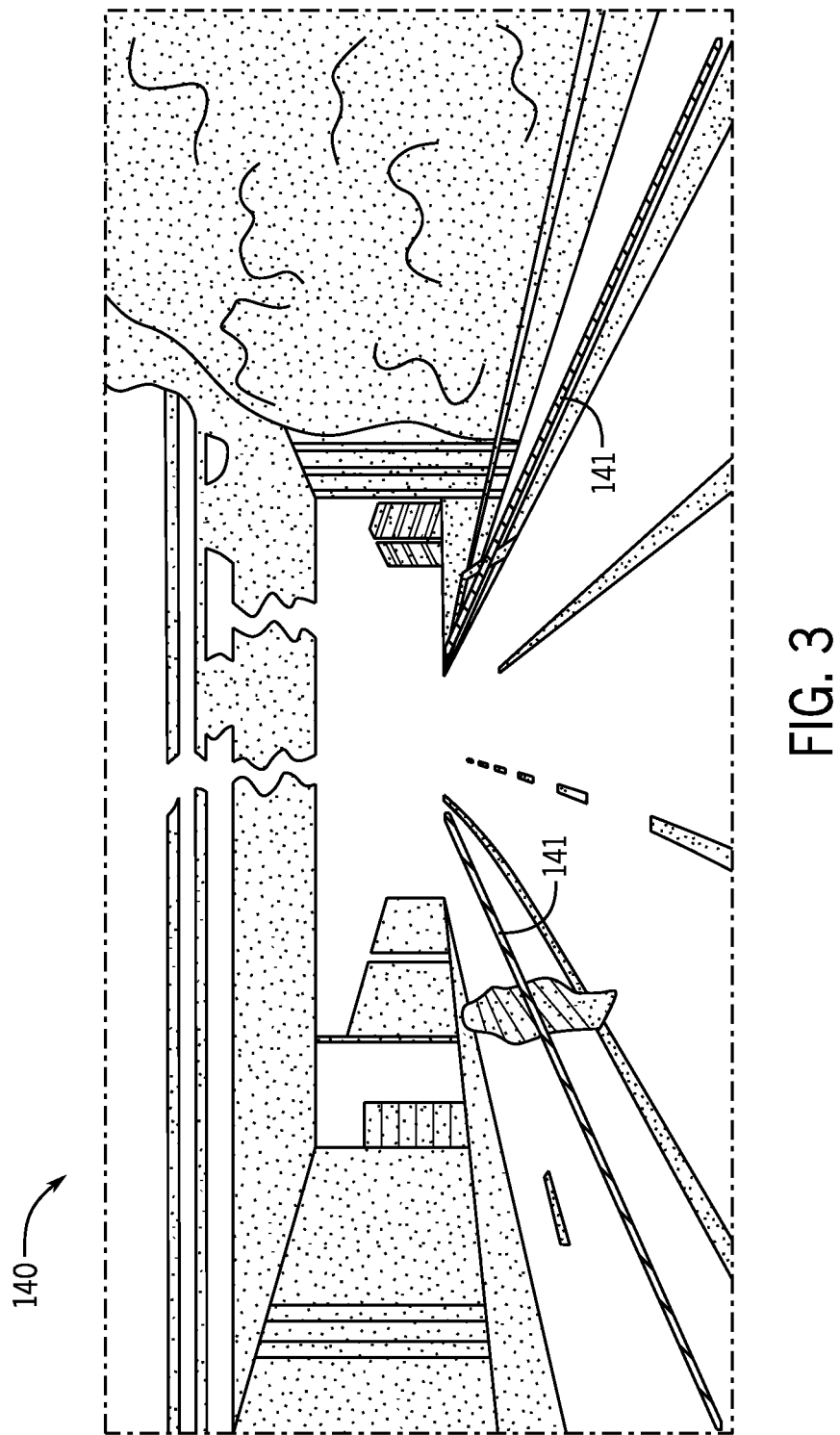
FIG. 3 illustrates the point cloud of FIG. 2 limited in relation to roadway boundaries.
Figure 4:
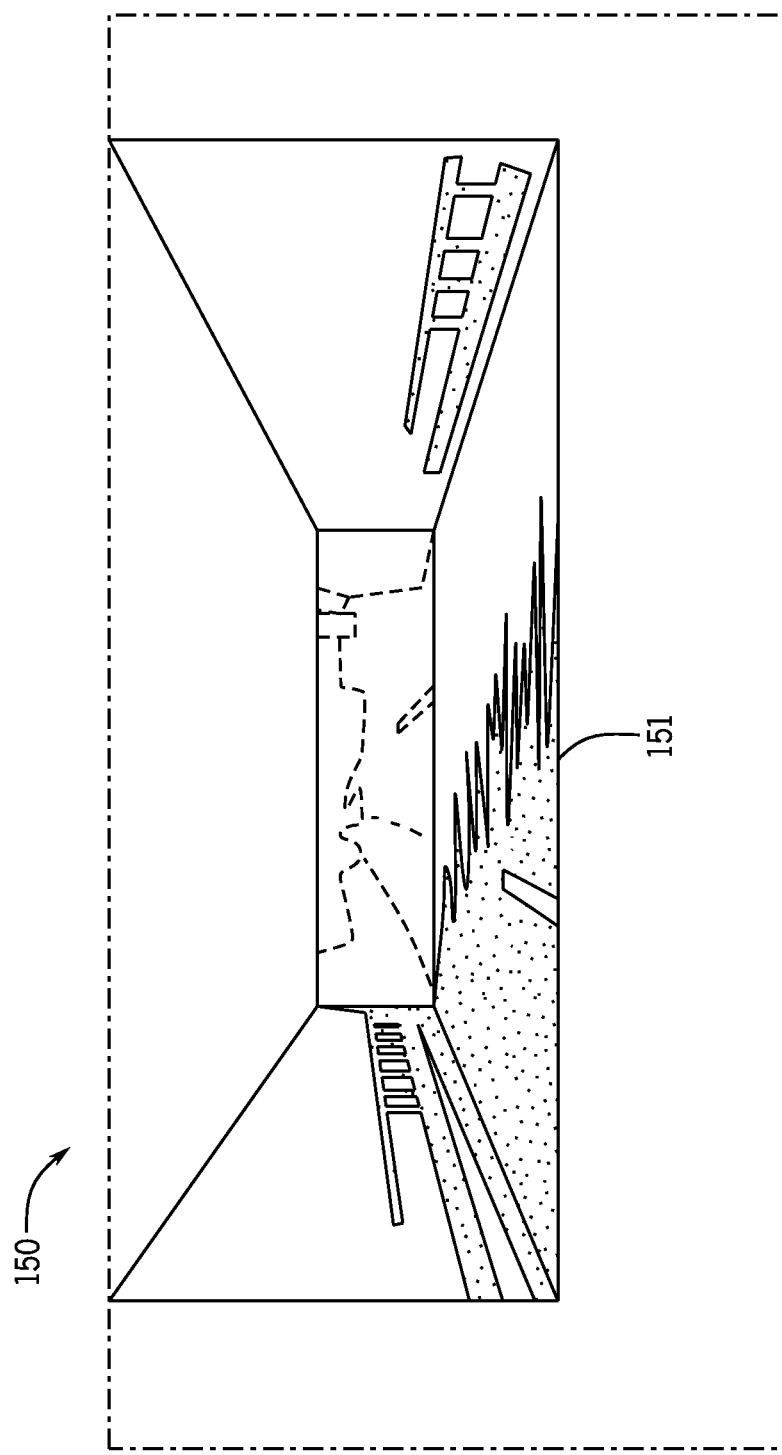
FIG. 4 illustrates a road box removed from the example point cloud of FIG. 2.

FIG. 3 illustrates the point cloud of FIG. 2 limited in relation to roadway boundaries 141. The point cloud may be filtered or limited according to a roadway box. The roadway box may be defined according to four planes designated based on a road segment stored in the geographic database 123. Two of the planes may be defined in a horizontal direction and perpendicular to the road segment, and the of the planes may be arranged in a vertical direction and parallel to the road segment. FIG. 4 illustrates a road box 150 including points 151 removed from the example point cloud of FIG. 2. In FIG. 4 the removed point cloud data from inside the road box 150 is removed and remaining point cloud data is illustrated along the boundaries of the road box. Side portions of the road box 150 illustrate objects adjacent to the roadway. As an example of possible variation in the alignment of the road box 150 and the roadway, some portions of the road surface were outside of the road box 150 and some portions of the road surface that were inside of the road box 150 were removed.

An example road segment in the geographic database 123 may be a line that extends from one node to an adjacent node. The road segments may be associated with road attributes such as curvature, width, or number of lanes. One or two planes defining the roadway box may be spaced from the road segment according to the width, curvature, or number of lanes. For example, vertical planes for the roadway box may coincide with the outer edge of the width of the roadway. Alternatively, the vertical planes may be shifted in by a predetermined spacer from the outer edge of the roadway. Examples of the predetermined spacer may include 0.1 meters, 0.5 meters, or 1 meter. The predetermined spacer is selected so that the boundaries of the roadway are included in the roadway box.

One or two planes defining the roadway box may be spaced from the road segment according to a road attribute for elevation. A plane corresponding to the road surface 132, or the elevation of the road segment may form the bottom horizontal plane of the roadway box. Another horizontal plane may form the top of the roadway box. This horizontal plane may be set above the bottom of the roadway box by a predetermined distance. Alternatively, the top of the roadway box may correspond to a particular elevation or set at a height relative to the collection device.

Figure 5:
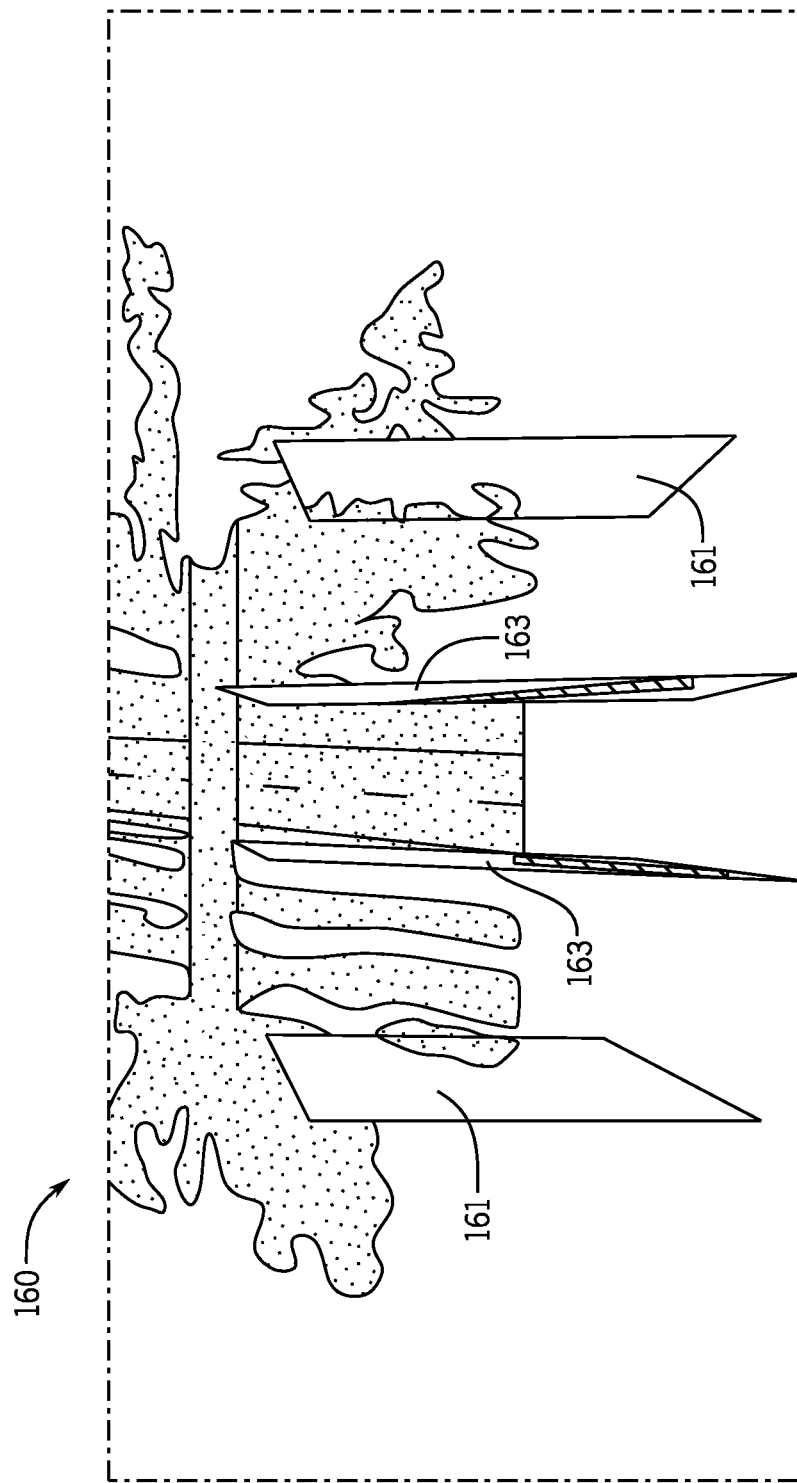
FIG. 5 illustrates an example set of outer boundaries for the example point cloud of FIG. 2.

FIG. 5 illustrates an example set of inner boundaries 163 forming the roadway box and a set of outer boundaries 161 for the point cloud. The mobile device 122 and/or the server 125 may filter data from the point cloud that is outside of the output boundaries 161. The mobile device 122 and/or the server 125 may filter point cloud data that is inside the roadway box.

The remaining data, which may be referred to as occupancy data, forms a set of data for forming the occupancy grid. The occupancy data may be shaped as two rectangular prisms that run parallel with the roadway. The occupancy data may be shaped as a square toroid or another type of toroid.

Figure 6:
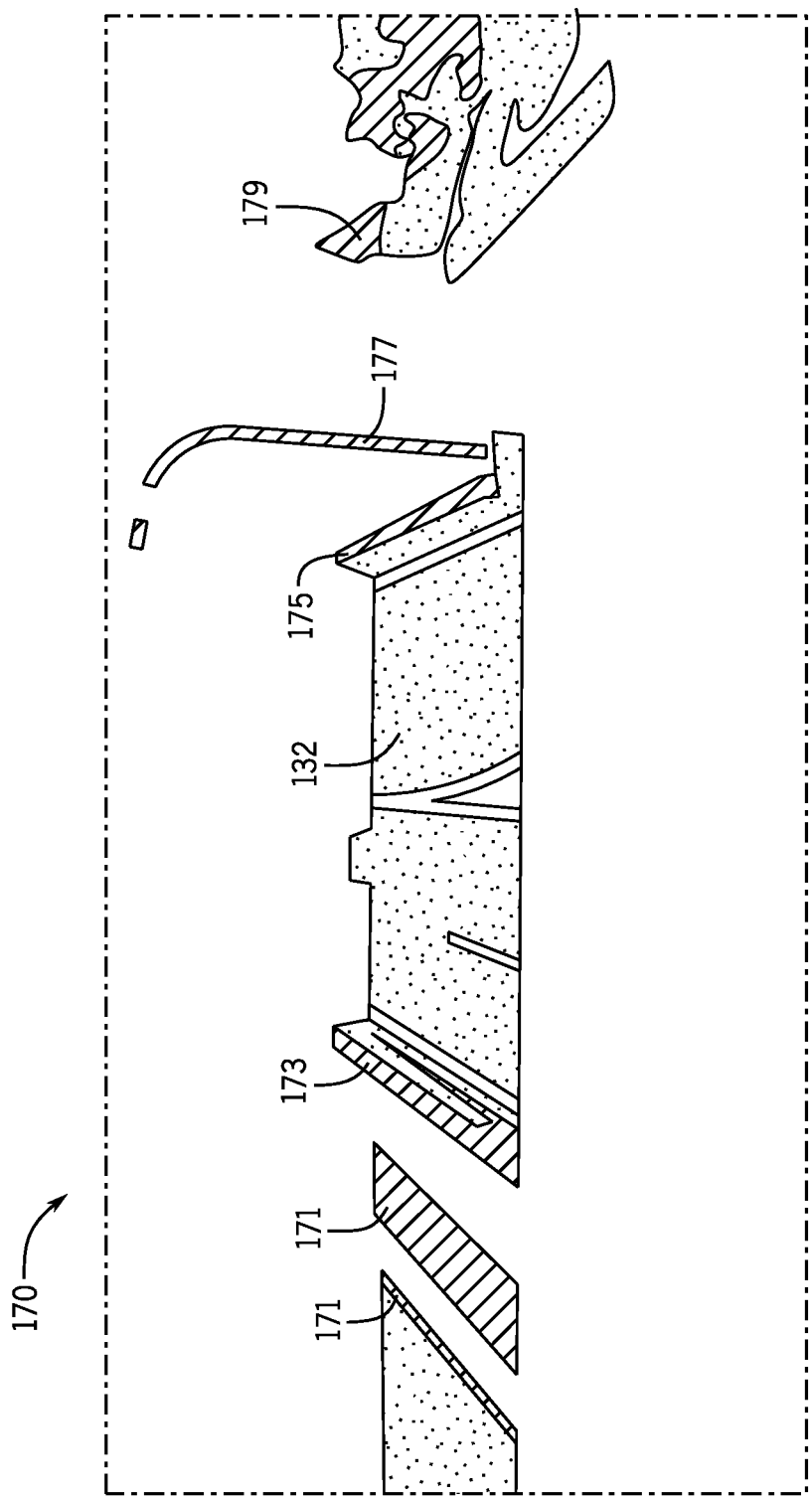
FIG. 6 illustrates an example of a filtered point cloud.

FIG. 6 illustrates an example of a filtered point cloud. Data inside the roadway box and outside of the outer boundaries 161 have been removed. The road surface 132 is illustrated only for reference.

The filtered point cloud includes data representative of objects in the vicinity of the roadway. For example, data 171 represents a patch of grass, data 173 represents barriers, data 175 represent a guardrail, data 177 represents a light and light post, and data 179 represents shrubbery or other vegetation. Together the data representing objects in the vicinity of the roadway form a signature for the particular location along the roadway. In some portions the filtered point cloud is empty, which means certain locations of the point cloud include no data.

Figure 7:
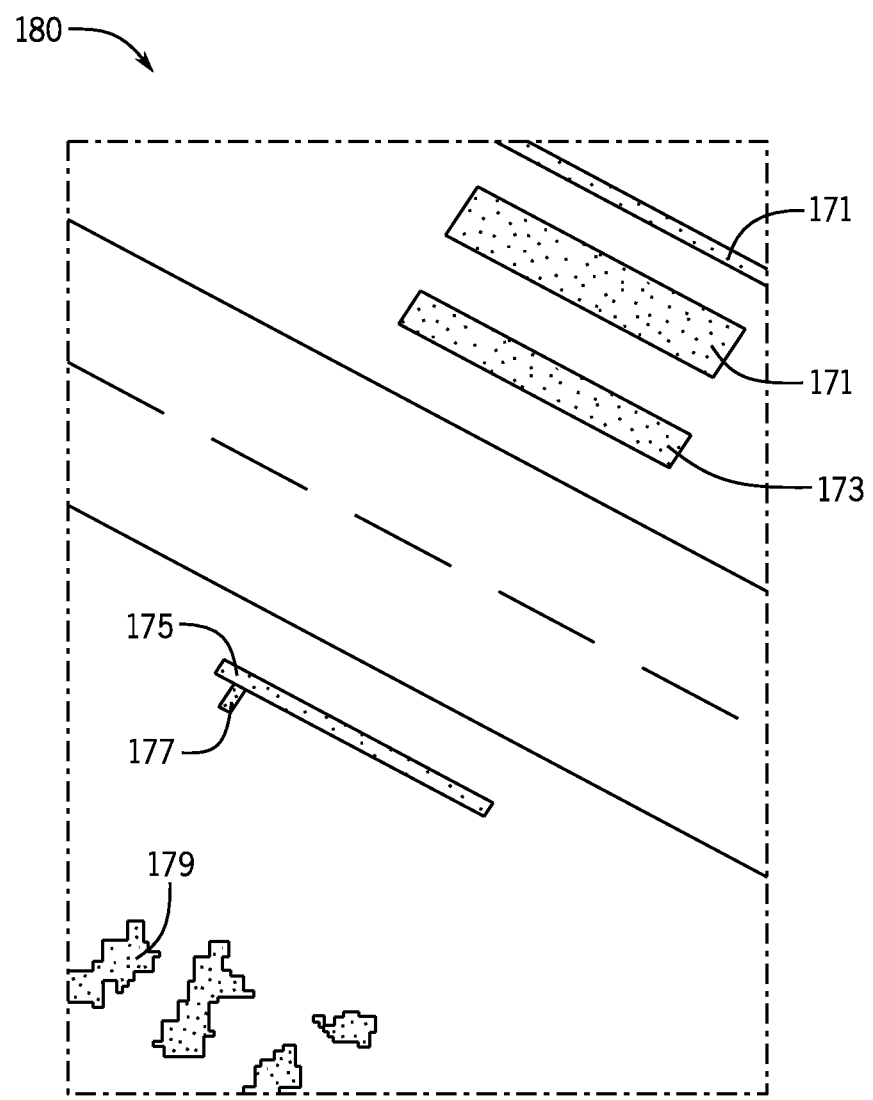
FIG. 7 illustrates the filtered point cloud of FIG. 6 projected on a plane.

FIG. 7 illustrates the filtered point cloud of FIG. 6 projected on a plane 180. The projection of data onto the plane may be calculated by constructing a line perpendicular to plane 180 and extending from each point or group of points in the filtered point cloud. In one example a reference vector is constructed from each point to a reference point in the plane 180. The reference vector is projected to a normal vector to the plane 180 and the result is subtracted from the point, which results in the projection of the point onto the plane 180.

The plane 180 may include projected representations for the data 171 representing the patch of grass, the data 173 representing barriers, the data 175 representing the guardrail, and the data 177 representing the light post.

Figure 8:
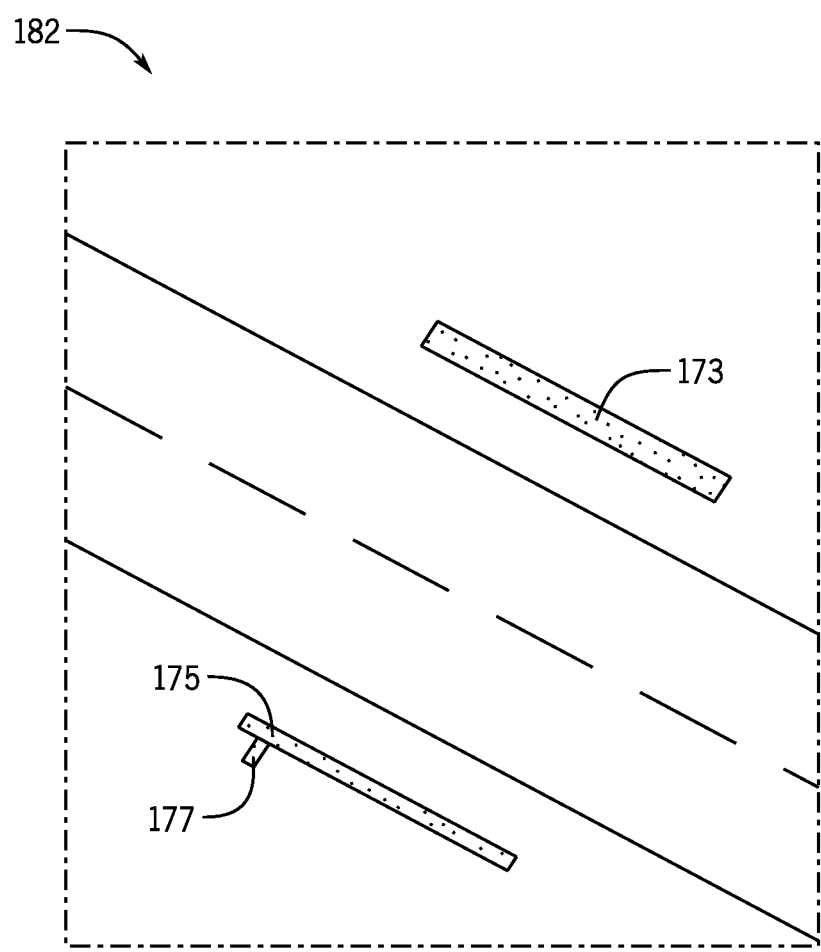
FIG. 8 illustrates the plane of FIG. 7 reduced according to height and/or quantity.

FIG. 8 illustrates the plane of FIG. 7 that is further reduced or filtered. The projected pixel formations on the plane may be filtered according to height. Some objects less than a threshold height (e.g., 1 foot, or 0.5 meters) may be removed from the projected data.

The projected pixel formations on the plane may be filtered according to density. Pixel formations in the projected data may be removed when fewer that a threshold quantity of points are included in a predetermined area. In one example, the threshold quantity is 30 points and the predetermined area is 100 square centimeters (cm$^2$).

In the example of FIG. 8, the data 171 for the grass has been filtered out. In addition, other shapes, such as the data 173 for barriers have changed shape according to the footprint above the threshold height. Further, the data 179 for shrubbery has been removed according to the density of the points representing the leaves being less than the quantity threshold.

Figure 9:
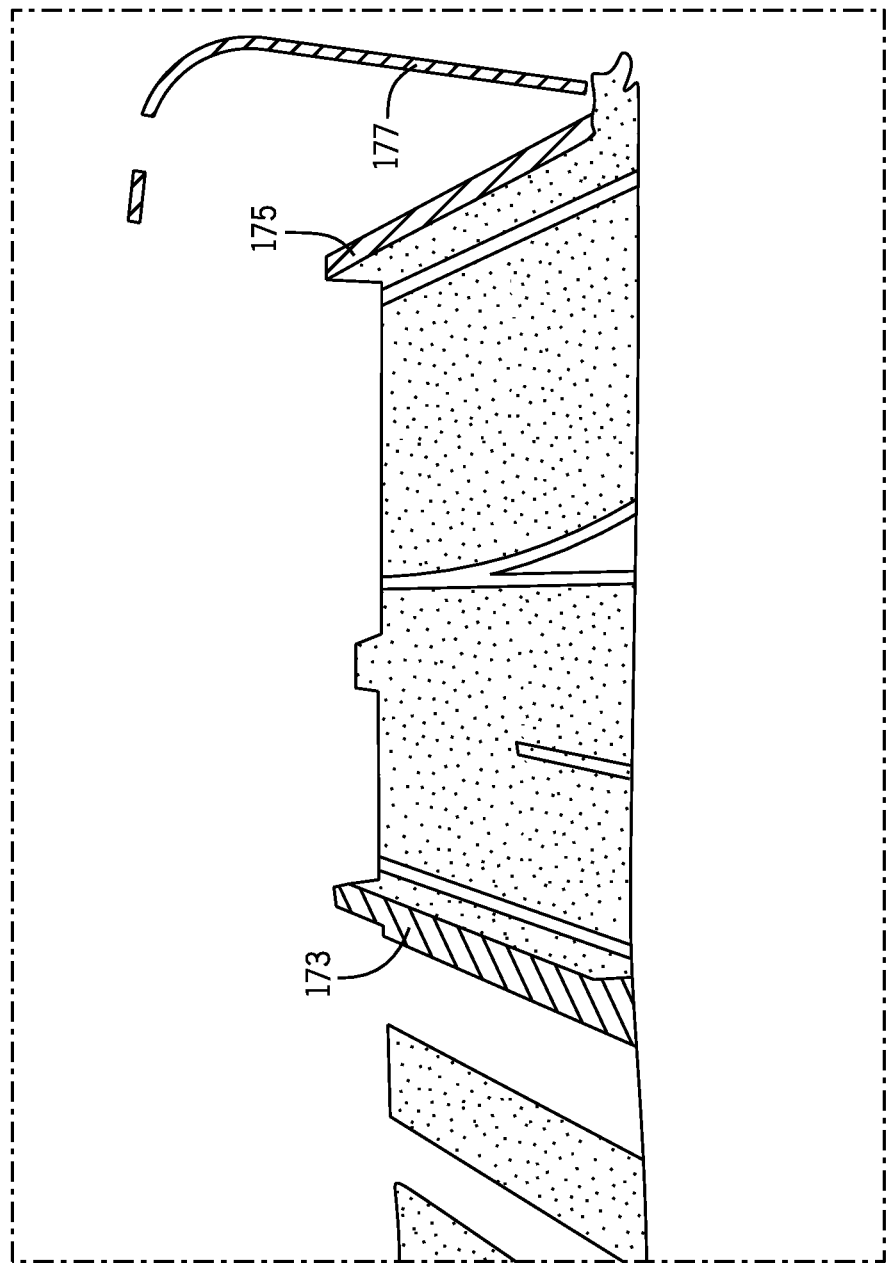
FIG. 9 illustrates isolated data points derived from the projection of FIG. 8.

FIG. 9 illustrates isolated data points derived from the non-filtered points in the projection of FIG. 8. FIG. 9 illustrates the non-filtered points, including the data 173 representing barriers, the data 175 representing the guardrail, and the data 177 representing the light post, in the context of the point cloud.

Figure 10:
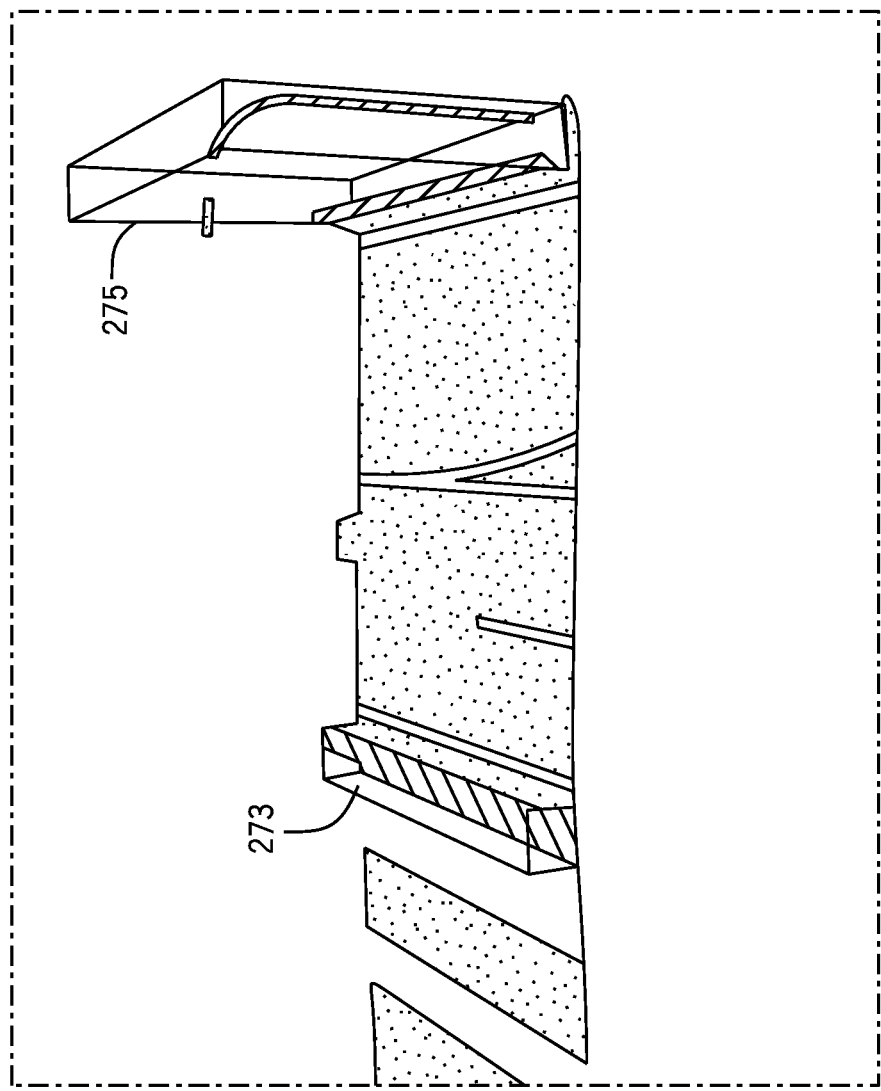
FIG. 10 illustrates occupancy volumes from the data points of FIG. 9.

FIG. 10 illustrates occupancy volumes from the data points of FIG. 9. The occupancy may be a volume that corresponded to the non-filtered points in the projected data. The volume for each pixel formation is extended to a predetermined height. The height may correspond to the height of the collect vehicle or the horizontal plane defining the top of the roadway box. In other words, each occupancy volume is constructed to have a cross-section corresponding to one of the non-filtered pixel formations in the projected data. Occupancy volume 273 corresponds to the data 173 representing the barriers. Occupancy volume 275 corresponds to the data 175 representing the guardrail, and the data 177 representing the light post.

Figure 11:
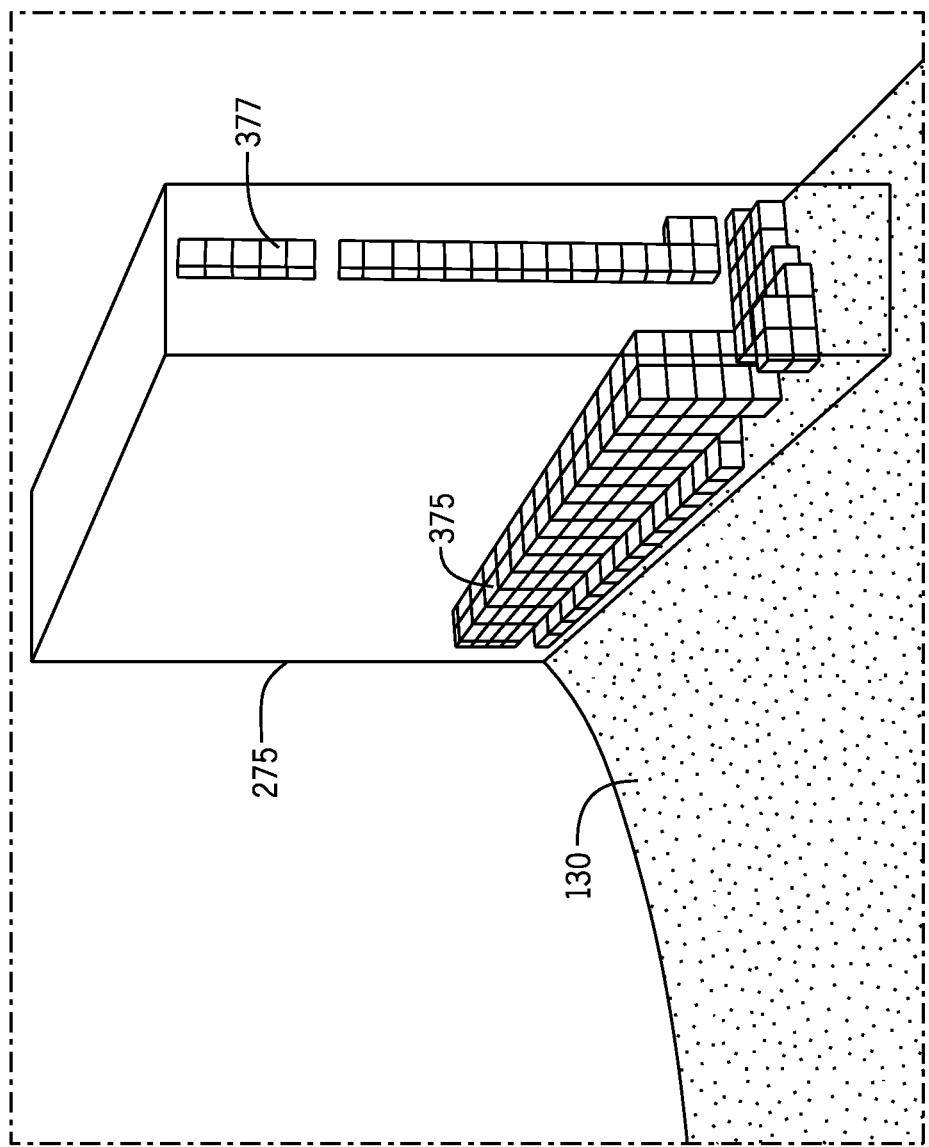
FIG. 11 illustrates an example set of occupancy grids.

FIG. 11 illustrates an example set of occupancy grids. Each occupancy volume includes multiple voxels, which are arranged in occupancy grids. Occupancy volume 275 includes voxels 377 for the light post and voxels 375 for the guardrail. The voxels may be designated by a binary value that indicates that the voxel either include data or do not include data. Alternatively, the voxels may include one or more characteristics of the data inside the voxel. The one or more characteristics may include relative location of the object within the voxel, shape, size, or other descriptors for the sensor data of the object.

In one example, the voxels are stored in an array of values that span the occupancy volume in a set order. For example, consider the space of occupancy volume 275. A primary direction of the volumetric grid may be the length of the occupancy volume 275, a second direction of the volumetric grid may be the width of the occupancy volume 275, and a tertiary direction of the volumetric grid may be a height of the occupancy volume 275. Thus, the array of values for the voxels starts in one corner then increments in a primary direction until a row is full, then fills rows in a first plane, incrementing rows in the secondary direction until the plane is full, and finally incrementing in the tertiary direction until the volume is full. The array is stored as occupancy data for the volumetric data according to a sequence of the primary direction, the secondary direction, and the tertiary direction.

Figure 12:
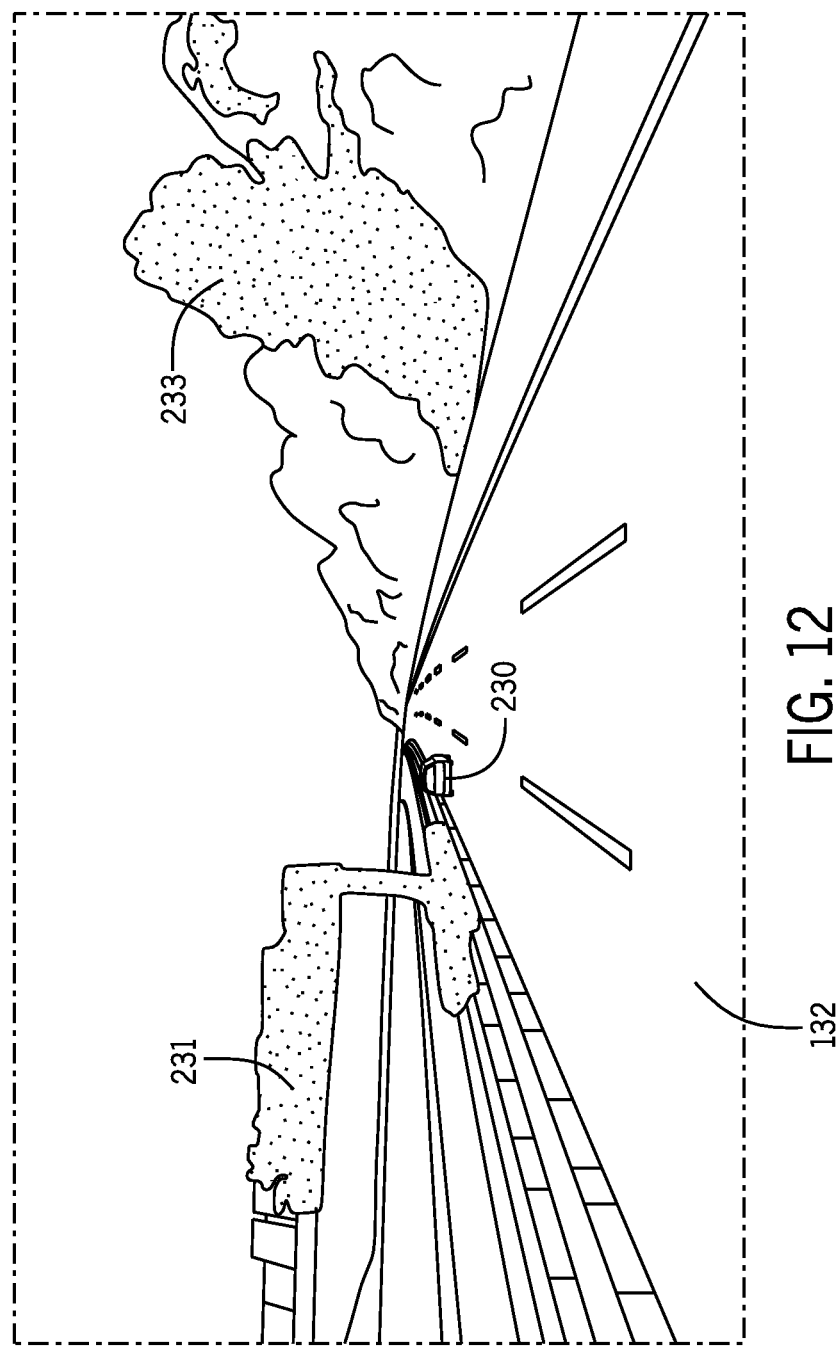
FIG. 12 illustrates an example localization application for the occupancy grids.

FIG. 12 illustrates an example localization application for the occupancy grids. The roadway 132 is associated with occupancy grids at specific locations. In one example, a set of occupancy grids is stored for each predetermined section of road, or chunk, of the roadway 132. For example, for the vehicle 230 is traveling at a particular location of the roadway 130 associated with left occupancy grid 231 and right occupancy grid 233.

In a localization technique, as a vehicle travels down roadway 132, data is collected along the roadway and compared to the left occupancy grid 231 and right occupancy grid 233. The collected data may be range rata (e.g., LiDAR) or image data (e.g., camera). A comparison of the collected data and the left occupancy grid 231 and right occupancy grid 233 determines the location of the vehicle 230. In one example, the vehicle 230 is matched with the predetermined section of road. In another example, the vehicle 230 is matched with a relative location along the predetermined section of road.

Finally, the matching of the collected data with the occupancy grids may serve as a redundancy for the GNSS system of the vehicle 230. For example, when the signature of the occupancy grid is locally unique enough to determine the location, the current measured location from the GNSS system is updated. A locally unique signature may occur when an object in the vicinity of the vehicle does not extend for a long distance of the roadway. For example, in the left occupancy grid 231 a sign is present, and signs are not continuous along the roadway. The right occupancy grid 233, however, may not include voxels that are locally unique because the shrubbery substantially extends for a distance along the roadway 132.

Figure 13:
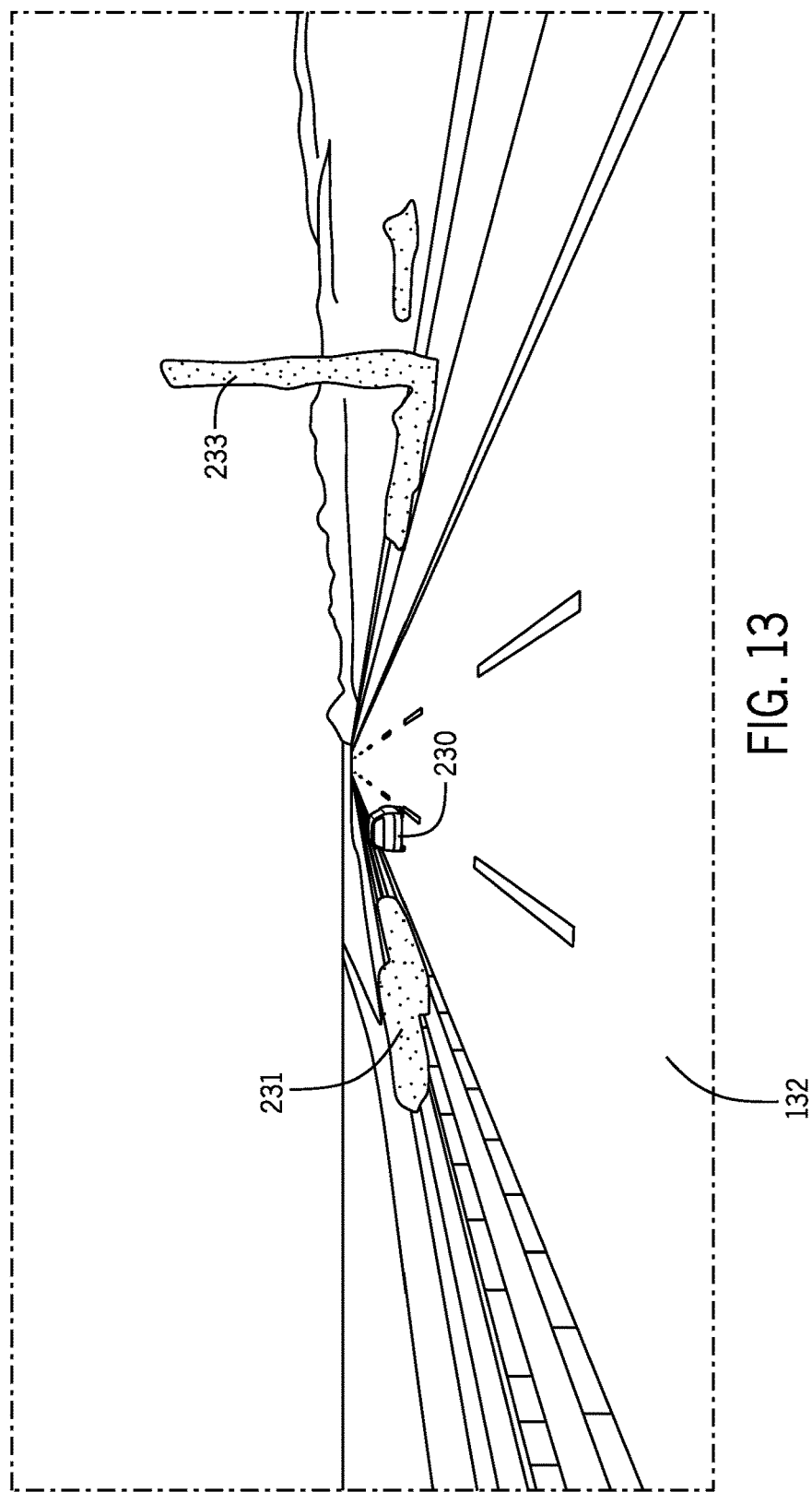
FIG. 13 illustrates an example localization application for the occupancy grids.

FIG. 13 illustrates another example localization application for the occupancy grids. In this example, left occupancy grid 231 includes data for a guardrail and the right occupancy grid 233 includes data for at least a light pole.

Figure 14:
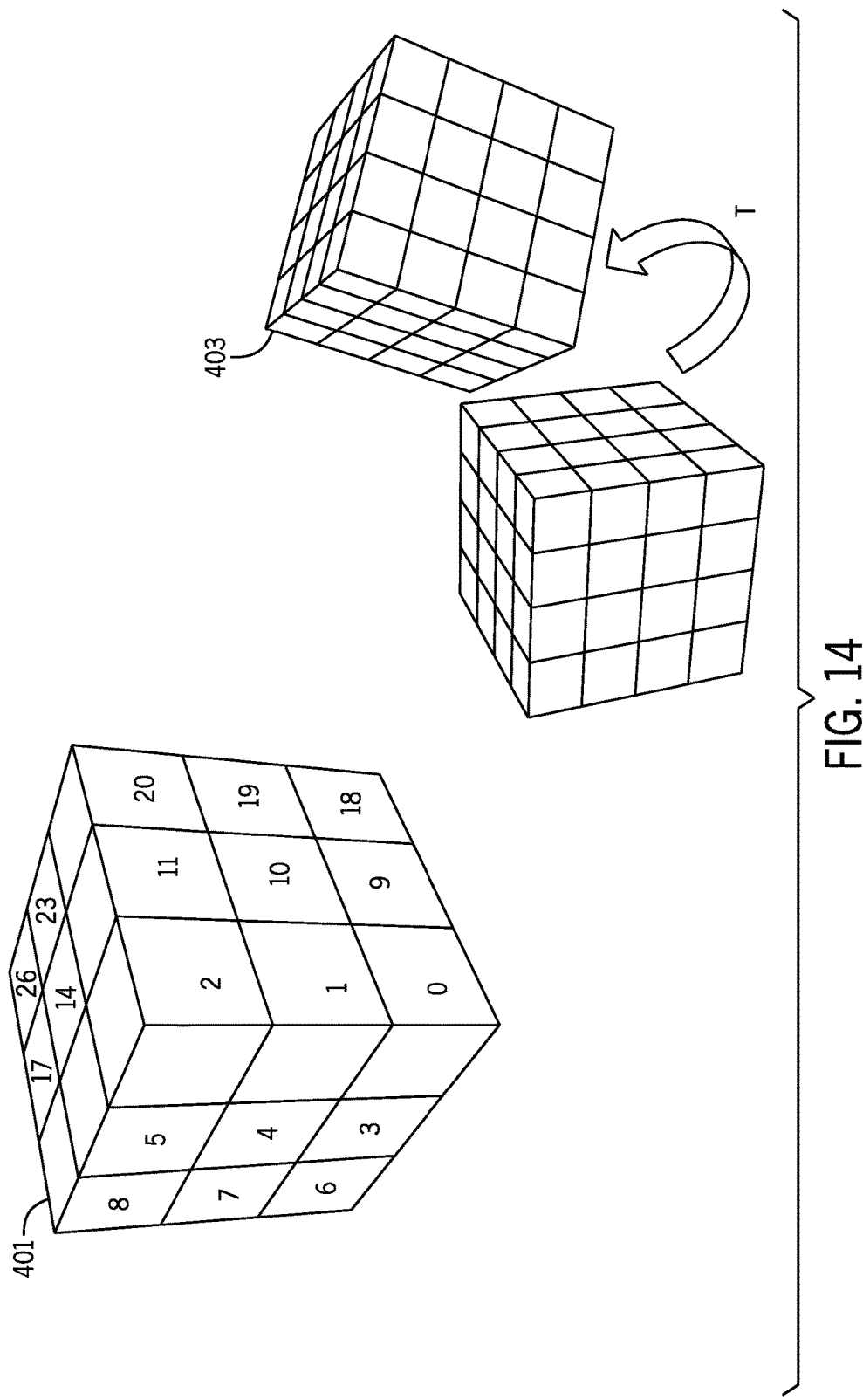
FIG. 14 illustrates an example voxel occupancy array.

FIG. 14 illustrates an example voxel occupancy array 401 and voxel transformation 403. The voxel occupancy array 401 may be cubical, a rectangular prism, or another shape. The voxel occupancy array 401 may include voxels that are numbered or ordered in a sequence across the shape. For example, FIG. 14 illustrates a numbering sequence from 0 to 26. The numbering begins in the front bottom, extends in a first direction from 0 to 2 in the sequence, then completes a plane in a second direction up to 8 in the sequence, and finally repeats the plane up to 26 in the sequence to form the voxel occupancy array 401. The occupancy array 401 is a canonical position according to the ordered sequence with the lower, left, rear point at the origin and voxels in extending into the first octant of a 3D Cartesian space.

The canonical grid is positioned in the x-direction, y-direction, and z-direction are unambiguous and aligned as the three sides or axes of the occupancy array 401. The axes of the occupancy array 401 are dependent on the axis of the collection device. The canonical grid may be positioned in the world (e.g., axes of the Earth) by providing a transformation to occupancy array 401. The transformation may be performed with a transformation matrix, a quaternion, or another matrix multiplication.

The axis of the collection device may be converted through reference coordinates (e.g., latitude, longitude, and altitude) to local tangent plane (LTP) coordinates. The LTP coordinates may include axes that are based on the World Geodetic System 1984 (WGS84). The WGS84 is an Earth fixed terrestrial reference system based on the size and shape of the Earth and the direction of gravity. The Z-axis is a direction up and perpendicular to the surface of the Earth or the roadway, which is a normal to the WGS84 ellipsoid. The Y-axis points north. The X-axis is perpendicular to the Z-axis and Y-axis (e.g., in the direction of east). The plane for Z=−altitude is tangent to the WGS84 ellipsoid.

When the transformation is performed with a transformation matrix 403, which may be referred to as a voxel grid transformation matrix. The transformation matrix 403 may have n+1 by n+1 values when the occupancy array 401 has n by n voxels. The transformation matrix 403 includes a rotation matrix followed by a translation vector. An example transformation matrix 403 may be converted or vectorized into an order such that elements of the rows of the matrix are placed into a vector (e.g., the first row of the matrix is concatenated with the second row of the matrix and so on). An example of such vectorization or reshaping may convert a 4×4 matrix into a 1×16 vector. An example of the order includes T(0,0) T(0,1) T(0,2) T(0,3) T(1,0) T(1,1) T(1,2) T(1,3) T(2,0) T(2,1) T(2,2) T(2,3) T(3,0) T(3,1) T(3,2) T(3,3). The transformation matrix T with elements T(row, col) converts points in the canonical voxel grid or occupancy array 401 in LTP coordinates to a general position in LTP coordinates.

When the transformation is performed with a quaternion, as an alternative to transformation matrix 403, the matrix is performed through rotations in three dimensions that are described as a sequence of rotations in a coordinate system. Each rotation is about an axis defined by a unit vector. The three vector components and the angle of rotation may be stored as a quaternion with four components. The quaternion technique may be used to eliminate ambiguities and precision issues (e.g., Gimble lock) in other types of 3D transformations.

An example pseudo code for encoding an occupancy grid may include:

ReferenceLatitude ReferenceLongitude ReferenceAltitude

VoxelSize

LengthX LengthY LengthZ

T(0,0) T(0,1) T(0,2) T(0,3) T(1,0) T(1,1) T(1,2) T(1,3) T(2,0) T(2,1) T(2,2) T(2,3) T(3,0) T(3,1) T(3,2) T(3,3)

OccupancyArray

Figure 15:
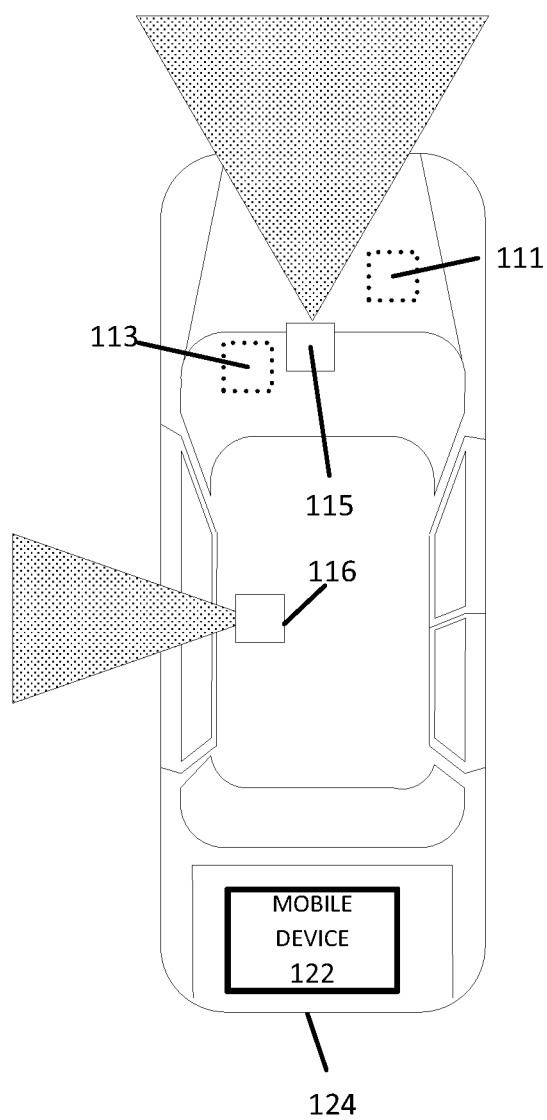
FIG. 15 illustrates an example mobile device.

FIG. 15 illustrates an example vehicle 124 for collecting data for the occupancy grids and/or for performing localization using the occupancy grids and subsequently collected distance data. A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device or smartphone in communication with a vehicle system. The communication device connects the vehicle to a network including at least one other vehicle and at least one server. The network may be the Internet or connected to the Internet.

The sensor array may include one or more sensors configured to detect surroundings of the vehicle. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

The mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122. The assisted driving vehicles may response to geographic data received from geographic database 123 and the server 125, which may have been updated according to the collection of data in the embodiments described herein. The assisted driving vehicle may be selected a route based on any of the examples herein, including in response to current location based on a comparison of the local sensor data to a voxel occupancy grid for a signature of the location.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order to pass the initial observation location or road object in response to the request for additional observations.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and the request for additional observations for the road object.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle.

Figure 16:
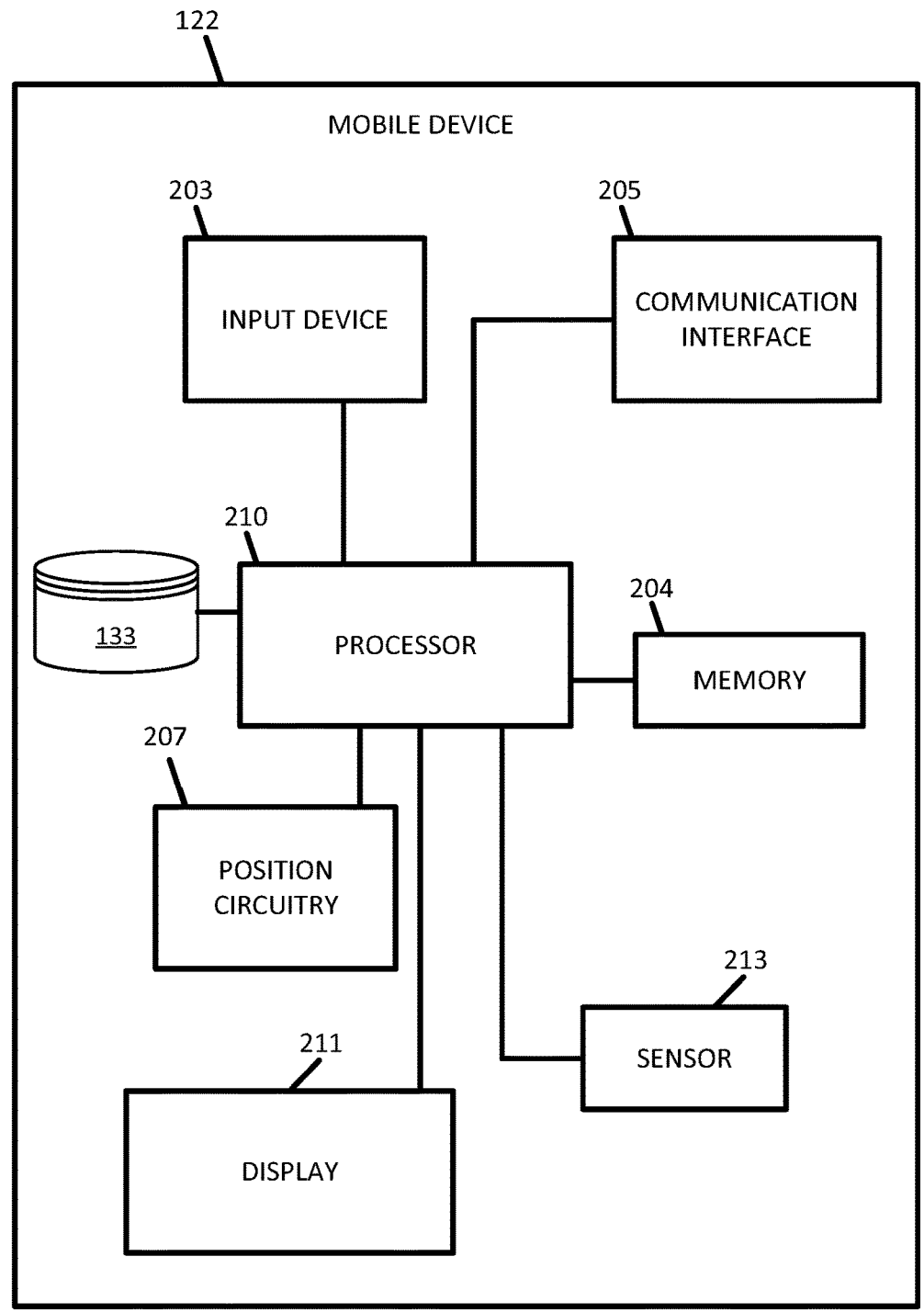
FIG. 16 illustrates an example flowchart for the mobile device of FIG. 14.
Figure 17:
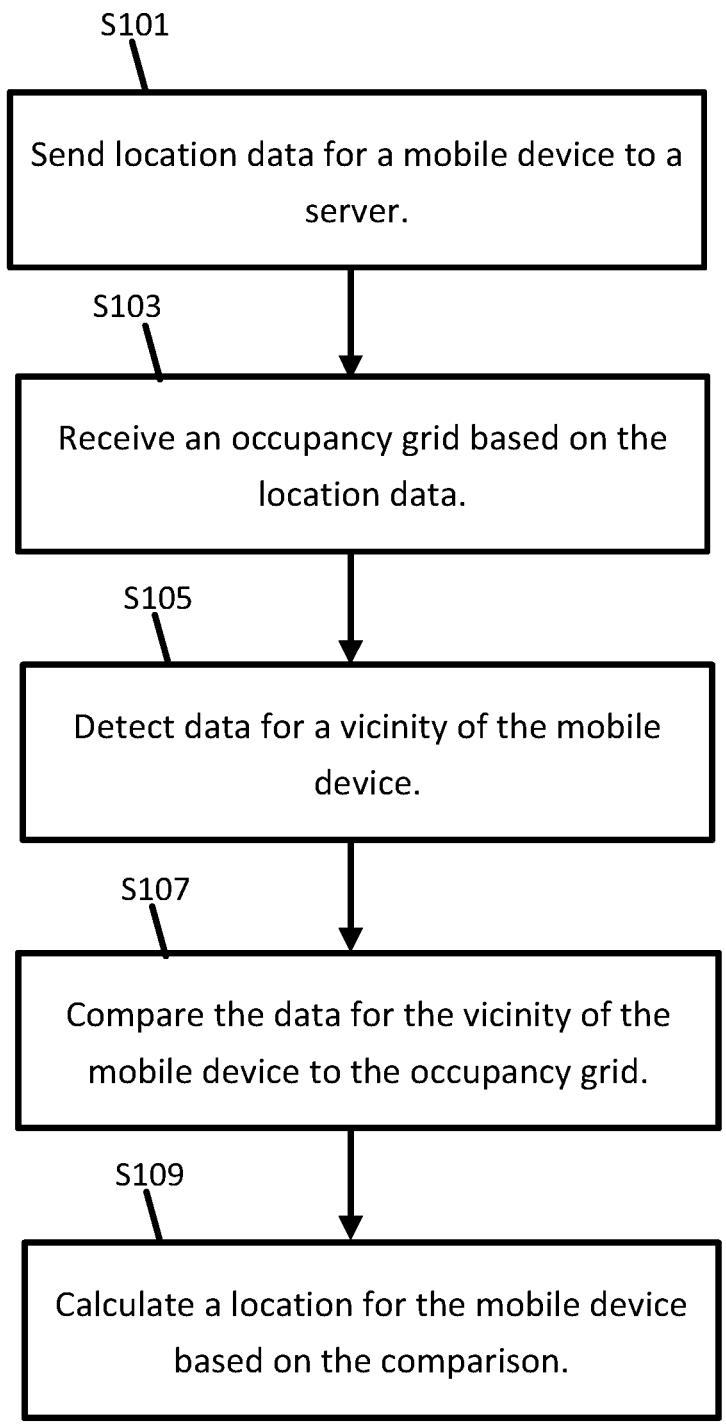
FIG. 17 illustrates an example server.

FIG. 16 illustrates an exemplary mobile device 122 of the system of FIG. 1. The mobile device 122 includes a processor 210, a vehicle database 133, a memory 204, an input device 203, a communication interface 205, position circuitry 207, a display 211, a sensor 213. The input device 203 may receive settings to enable or disable the mobile device for collecting observations. Additional, different, or fewer components are possible for the mobile device 122. FIG. 17 illustrates an example flowchart for the mobile device of FIG. 16. Additional, different, or fewer steps may be included.

At act S101, the position circuitry 207 or the processor 210 detects a geographic position of the mobile device 122 or the vehicle and sends the geographic location for the mobile device 122 to a server. The position circuitry 207 is one example means for detecting or determining a geographic position. The processor 210 also includes circuitry serving as means for detecting or determining a geographic position. The detected geographic position of the mobile device 122 may include a latitude and longitude pair. The geographic position may be detected or sampled at periodic intervals in time or distance. The sensor 213, which may include distancing sensors, range sensor, image sensors, or another sensor as described with respect to FIG. 15 may also provide information for determining the geographic position of the mobile device 122.

At act S103, the processor 210 or the communication interface 205 receives an occupancy grid based on the location data. The communication interface 205 is an example for a means for receiving the occupancy grid. The processor 210 may include circuitry or a module or an application specific controller as a means for receiving the occupancy grid. The occupancy grid may have been generator by the server as an efficient description of objects that correspond to the location data and as a signature of the surrounding of the location data. The occupancy grid may include a pattern of voxels as the signature. The occupancy grid may include one value for voxels that do not correspond to object in the surroundings and another value for voxels that do correspond to objects in the surroundings.

At act S105, the processor 210 or the sensor 213 detects data (e.g., point cloud data) for a vicinity of the mobile device 122. The sensor 213 may include a range finding sensor that outputs distance data for the distance to the nearest object in multiple directions from the mobile device 122. The sensor 213 may include an image capture device that outputs image data, which may be manipulated to calculate the distance data to the nearest object in multiple directions from the mobile device 122. The senor 213 is an example means for detecting the vicinity of the mobile device 122.

At act S107, the processor 210 compares the data for the vicinity of the mobile device 122 to the occupancy grid received in act S103. The data for the vicinity of the mobile device 122 may be categorized into a three-dimensional grid corresponding to the voxels of the occupancy grid. The processor 210 compares a value of each voxel to the corresponding vicinity data. The values of the voxels of the occupancy grid may be a signature vector, and the vicinity data may be arranged in a similar vector. The processor 210 compares the signature vector to the vicinity data vector to calculate a number of matching voxels. The processor 210 may include circuitry or a module or an application specific controller as a means for comparing the vicinity data to the occupancy grid.

At act S109, the processor 210 calculates or determines a location for the mobile device based on the comparison of act S107. The processor 210 may include circuitry or a module or an application specific controller as a means for determining the location of the mobile device based on the occupancy grid comparison. The processor 210 may determine a number of matching voxels based on the comparison of the signature vector to the vicinity data vector. When a certain number of voxels match, the processor 210 determines that the current location of the mobile device 122 or a location when the vicinity data was detected corresponds to the occupancy grid. The match may be determined with a predetermined quantity of voxels (e.g., 100 voxels, 500 voxels, or 1000 voxels) match the vicinity data. The match may be determined when a predetermined percentage of the voxels (e.g., 50%, 90%, or 99%) match the vicinity data.

The processor 210 may include a routing module including an application specific module or processor that calculates routing between an origin and destination. The routing module is an example means for generating a routing command based on the current location of the mobile device 122 from the occupancy grid comparison. The routing command may be a route from the route to the destination. The routing command may be a driving instruction (e.g., turn left, go straight), which may be presented to a driver or passenger, or sent to an assisted driving system. The display 211 is an example means for displaying the routing command. The routing command may be derived from a road network or map data stored in database 133. The database 133 is an example means for storing map data including a road network.

The mobile device 122 may generate a routing instruction based on the vehicle database 133. The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile device 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system, or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

Figure 18:
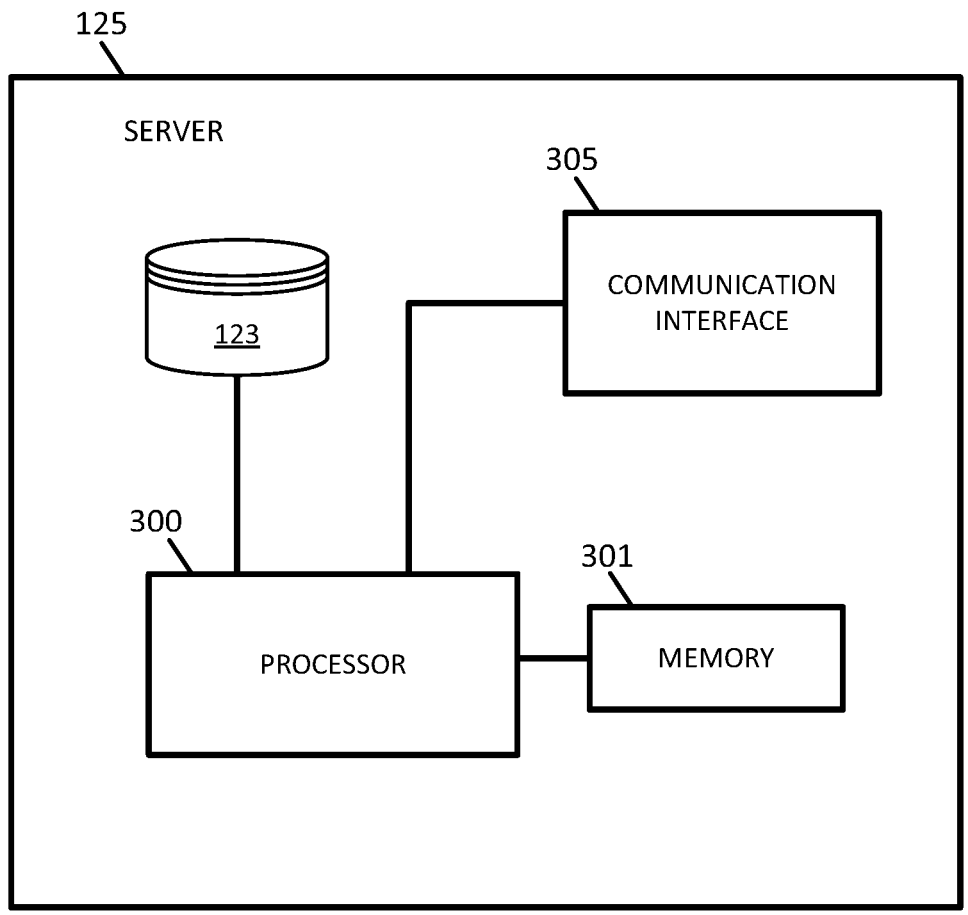
FIG. 18 illustrates an example flowchart for the server of FIG. 16.

FIG. 18 illustrates an example server 125, which may apply to the system of FIG. 1. The server 125 includes a processor 300, a communication interface 305, a memory 301, and a database 123. An input device (e.g., keyboard or personal computer) may be used to enter settings to the server 125. Additional, different, or fewer components may be provided in the server 125.

Figure 19:
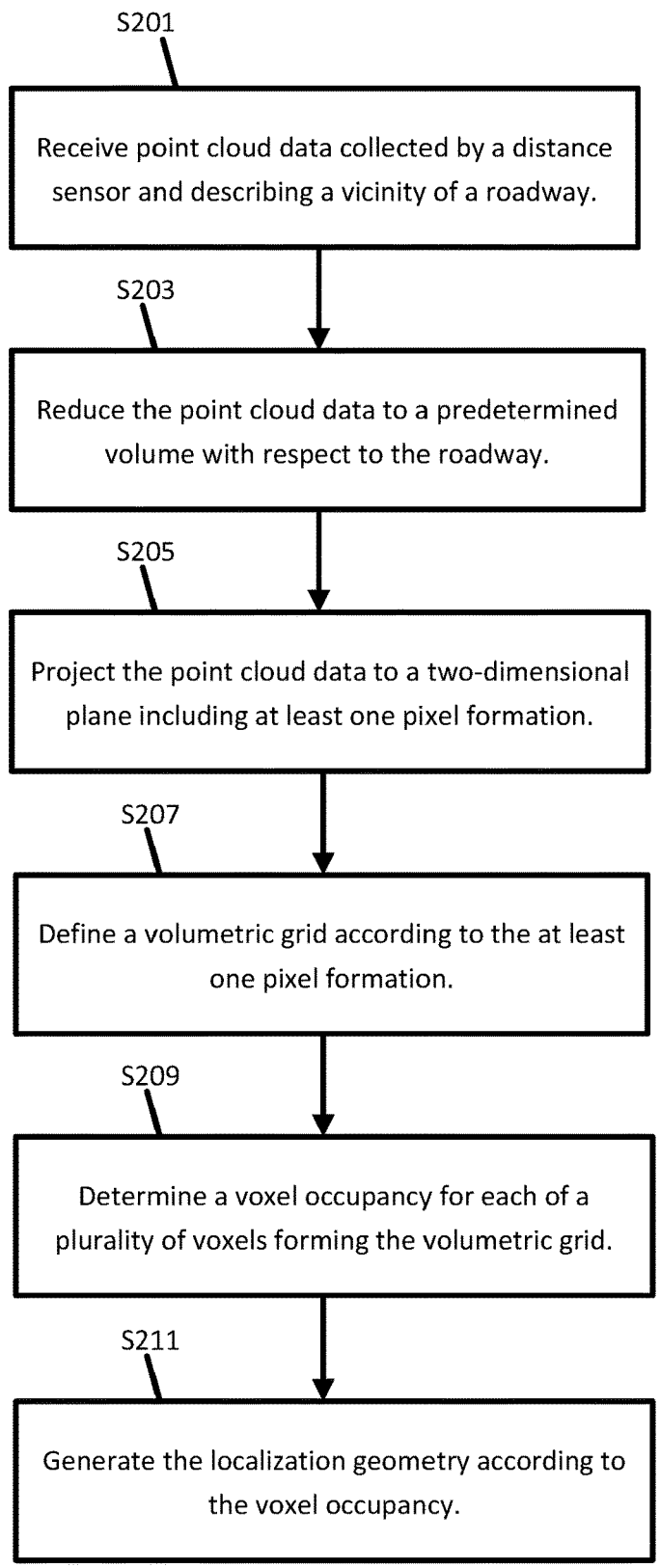
FIG. 19 illustrates an example flowchart of the operation of the server in a building occupancy grid.

FIG. 19 illustrates an example flowchart for the operation of server 125 in building an occupancy grid. Additional, different, or fewer acts may be provided.

At act S201, the processor 300 receives point cloud data collected by a distance sensor and describing a vicinity of a roadway. The point cloud data may be generated by the mobile device 122 (e.g., act S105 above). The communication interface 305 may be means for receiving a point cloud. The processor 300 may include circuitry or a module or an application specific controller as a means for receiving the point cloud. The point cloud may be divided into longitudinal sections along the length of the roadway. The point cloud may be analyzed in these sections such that each occupancy grid corresponds to one of the longitudinal sections.

At act S203, the processor 300 reduces the point cloud data to a predetermined volume with respect to the roadway. The processor 300 may include circuitry or a module or an application specific controller as a means for filtering or reducing the point cloud data. In some examples, the point cloud may be reduced to exclude data within a rectangular prism positioned in parallel with the roadway. The rectangular prism may be defined according to vertical walls including a first horizontal border of the roadway and a second horizontal border of the roadway such that the point cloud is filtered to remove data between the first horizontal border and the second horizontal border. The rectangular prism may be defined according to horizontal walls including a first vertical border in a plane parallel to the roadway and a second vertical border in a plane parallel to the roadway such that the point cloud is filtered to remove data between the first vertical border and the second vertical border.

The point cloud may also be filtered to remove data that is more than a threshold distance from the point of collection or from the rectangular prism of the roadway. The processor 300 may filter data from the point cloud that is outside an outer border for the roadway. The outer boarder may be spaced at the threshold distance from either of the vertical walls and/or either of the horizontal walls. The remaining data for the point cloud may be shaped in a rectangular ring. The rectangular ring is a larger rectangular prism having removed therefrom the smaller rectangular prism of the roadway. When the bottom horizontal bottom of the rectangular prism of the roadway is the roadway surface, the remaining point cloud data may be a u-shaped prism.

At act S205, the processor 300 projects the point cloud data to a two-dimensional plane including at least one pixel blob or other formation. The processor 300 may include circuitry or a module or an application specific controller as a means for projecting the point cloud. For objects to the side of the roadway, which includes the right side of the u-shaped prism and the left side of the u-shaped prism, the data is project to the bottom plane. For objects directly above the roadway, the data is projected to the roadway surface or another plane parallel to the roadway surface.

Consider an example where to the right of the roadway, a guardrail extends along the roadway and a tree grows next to and above the roadway. The data in the point cloud for the tree and the data for the guardrail are projected onto the horizontal plane. The data for the tree and the data for the guardrail may overlap in portions. The processor 300 analyzes the projected data to determine whether a continuous or semi-continuous blob is formed, which may be through a connected component analysis or connected component labeling. Connectivity is determined by labeling components and classifying their connectivity in the image graph. A shape or blob may be identified based on the connectivity. For example, neighboring components may form blobs or shapes when the number of nodes or edges that would need to be removed to separate the two neighboring components is greater than a threshold value (e.g., an integer from two to eight). When projected points forming blobs have less than a predetermined number of data points, those pixel formations are removed.

At act S207, the processor 300 defines a volumetric grid according to the at least one pixel formation. The processor 300 may include circuitry or a module or an application specific controller as a means for defining the volumetric grid. The processor 300 may construct the volumetric grid by extended a volume that coincides with one or more blobs of pixels. The volumes may correspond to cells in the two-dimensional plane. Thus, cells in the two-dimensional plane that include blobs of pixels are extended into the volumetric grid.

The volumetric grid may have voxels that are the same size. Alternatively, the voxels may be different sizes. In one example, voxels are smaller near the road surface and a larger at higher heights or elevations. In one example, the voxels are sized proportionally to the height. The size of the voxels may be selected according to other factors such as whether the area is urban or rural, the functional classification of the roadway, the speed limit of the roadway, or other factors.

In some examples, the volumetric grid, even when reduced through the analysis in the two-dimensional plane, may include large amounts of empty space. The processor 300 may perform another connected component analysis in 3D on the initial object voxel grid to separate the grid into grids that represent objects that are separable in 3D.

At act S209, the processor 300 determines a voxel occupancy for each of a plurality of voxels forming the volumetric grid. The processor 300 may include circuitry or a module or an application specific controller as a means for determining voxel occupancy. The voxel occupancy may be a single bit value that identifies whether or not the voxel is occupied. The voxel occupancy may include more detailed information for the voxel such as a percentage that the point cloud fills the voxel or a cross-section of the voxel. The voxel occupancy may include relative locations of all of the point cloud data included in the voxel.

The memory 301 may be configured to store the occupancy data for the grid arranged in an order that spans multiple dimensions of the grid. That is a vector or an array may be defined that spans each dimension of the grid that is stored by the memory 301. Thus, memory 301 is a means for storing the occupancy grid in a particular order dependent on the dimensions of the grid.

At act S211, the processor 300 generates the localization geometry according to the voxel occupancy. The processor 300 may include a module or an application specific controller as a means for generating localization geometry. The localization geometry may include the occupancy grid with voxel occupancy that has been transformed to a world coordinate system or geodetic coordinates. The data may be transformed from the coordinate system of collection to the world coordinate system using a transformation matrix or a transformation quaternion.

The communication interface 305 may send the localization geometry to the mobile device 122 is response to receiving location data from the mobile device 122. The processor 300 may query the geographic database 123 with the location data to select the localization geometry, which may include an occupancy grid.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Communication between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

The controller 210 and/or processor 300 may include a general processor, digital signal processor, an application specific integrated circuit (ASIC), field programmable gate array (FPGA), analog circuit, digital circuit, combinations thereof, or other now known or later developed processor. The controller 210 and/or processor 800 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 and 133 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for automatic generation of a localization geometry, the method comprising:
  receiving point cloud data collected by a distance sensor and describing a vicinity of a pathway;
  reducing, by a processor, the point cloud data to a predetermined volume with respect to the pathway;
  projecting, by the processor, the point cloud data to a two-dimensional plane including at least one pixel formation;
  defining, by the processor, a volumetric grid according to the at least one pixel formation;
  determining, by the processor, a voxel occupancy for each of a plurality of voxels forming the volumetric grid; and
  generating, by the processor, the localization geometry according to the voxel occupancy.

Embodiment 2

The method of embodiment 1, wherein reducing the point cloud data to the predetermined volume includes:
  determining a first horizontal border of the pathway;
  determining a second horizontal border of the pathway; and
  filtering data of the point cloud data to remove data between the first horizontal border and the second horizontal border.

Embodiment 3

The method of embodiments 1-2, wherein reducing the point cloud data to the predetermined volume includes:
  determining a first vertical border in a plane parallel to the pathway;
  determining a second vertical border in a plane parallel to the pathway; and
  filtering data of the point cloud data to remove data between the first vertical border and the second vertical border.

Embodiment 4

The method of embodiments 1-3, wherein the first vertical border corresponds to a height of a collection vehicle for the point cloud data.

Embodiment 5

The method of embodiments 1-4, wherein reducing the point cloud data to the predetermined volume includes:
  determining an outer border for the pathway; and
  filtering data of the point cloud data to remove data farther from the pathway than the outer border.

Embodiment 6

The method of embodiments 1-5, further comprising:
  defining a plurality of chunks of the pathway, each chunk having a predetermined length, wherein at least one object described in the point cloud data extends across multiple chunks.

Embodiment 7

The method of embodiments 1-6, wherein the two-dimensional plane includes a two-dimensional grid having cells of a predetermined area, the method further comprising:
  filtering data in cells having less than a predetermined number of data points.

Embodiment 8

The method of embodiments 1-7, further comprising:
  identifying the at least one pixel formation from the two-dimensional plane; and
  generating the volumetric grid from the at least one pixel formation.

Embodiment 9

The method of embodiments 1-8, further comprising:
  defining a primary direction in the volumetric grid;
  defining a secondary direction in the volumetric grid;
  defining a tertiary direction in the volumetric grid; and
  storing occupancy data for the volumetric data according to a sequence of the primary direction, the secondary direction, and the tertiary direction.

Embodiment 10

The method of embodiments 1-9, further comprising:
  transforming the volumetric grid to the localization geometry according to a transformation matrix or a transformation quaternion.

Embodiment 11

The method of embodiments 1-10, wherein the volumetric grid is in local coordinates and the localization geometry is in geodetic coordinates.

Embodiment 12

The method of embodiments 1-11, wherein subsequent point cloud data is compared to the localization geometry in order to determine a geographic position of a mobile device.

Embodiment 13

An apparatus, configured to perform and/or control the method of any of embodiments 1-12 or comprising means for performing and/or controlling any of embodiments 1-12.

Embodiment 14

An apparatus, comprising at least one processor and at least one memory including computer program code for one or more programs, the at least one memory and the computer program code configured to, with the at least one processor, to perform and/or control the method of any of embodiments 1-12.

Embodiment 15

A computer program comprising instructions operable to cause a processor to perform and/or control the method of any of embodiments 1-12, when the computer program is executed on the processor.

We claim:

1. A method for automatic generation of a localization geometry, the method comprising:
   receiving point cloud data collected by a distance sensor and describing a vicinity of a pathway;
   reducing, by a processor, the point cloud data to a predetermined volume with respect to the pathway;
   projecting, by the processor, the point cloud data to a two-dimensional plane including at least one pixel formation;
   defining, by the processor, a volumetric grid according to the at least one pixel formation;
   determining, by the processor, a voxel occupancy for each of a plurality of voxels forming the volumetric grid; and
   generating, by the processor, the localization geometry according to the voxel occupancy.

2. The method of claim 1, wherein reducing the point cloud data to the predetermined volume includes:
   determining a first horizontal border of the pathway;
   determining a second horizontal border of the pathway; and
   filtering data of the point cloud data to remove data between the first horizontal border and the second horizontal border.

3. The method of claim 1, wherein reducing the point cloud data to the predetermined volume includes:
   determining a first vertical border in a plane parallel to the pathway;
   determining a second vertical border in a plane parallel to the pathway; and
   filtering data of the point cloud data to remove data between the first vertical border and the second vertical border.

4. The method of claim 3, wherein the first vertical border corresponds to a height of a collection vehicle for the point cloud data.

5. The method of claim 1, wherein reducing the point cloud data to the predetermined volume includes:
   determining an outer border for the pathway; and
   filtering data of the point cloud data to remove data farther from the pathway than the outer border.

6. The method of claim 1, further comprising:
   defining a plurality of chunks of the pathway, each chunk having a predetermined length, wherein at least one object described in the point cloud data extends across multiple chunks.

7. The method of claim 1, wherein the two-dimensional plane includes a two-dimensional grid having cells of a predetermined area, the method further comprising:
   filtering data in cells having less than a predetermined number of data points.

8. The method of claim 1, further comprising:
   identifying the at least one pixel formation from the two-dimensional plane; and
   generating the volumetric grid from the at least one pixel formation.

9. The method of claim 1, further comprising:
   defining a primary direction in the volumetric grid;
   defining a secondary direction in the volumetric grid;
   defining a tertiary direction in the volumetric grid; and
   storing occupancy data for the volumetric data according to a sequence of the primary direction, the secondary direction, and the tertiary direction.

10. The method of claim 1, further comprising:
    transforming the volumetric grid to the localization geometry according to a transformation matrix or a transformation quaternion.

11. The method of claim 10, wherein the volumetric grid is in local coordinates and the localization geometry is in geodetic coordinates.

12. The method of claim 1, wherein subsequent point cloud data is compared to the localization geometry in order to determine a geographic position of a mobile device.

13. An apparatus for automatic generation of a localization geometry of a roadway, the apparatus comprising:
    a communication interface configured to receive point cloud data collected by a distance sensor and describing a vicinity of a roadway; and
    a controller configured to reduce the point cloud data to a predetermined volume with respect to the roadway, project the point cloud data to a two-dimensional plane including at least one pixel formation, and determine a voxel occupancy for each of a plurality of voxels corresponding to the at least one pixel formation,
    wherein the voxel occupancy for a grid defines the localization geometry of the roadway.

14. The apparatus of claim 13, wherein the controller reduces the point cloud data according to removal of data between borders associated with the roadway.

15. The apparatus of claim 13, wherein the controller reduces the point cloud data according to removal of data between a first vertical border in a plane parallel to the roadway and a second vertical border in a plane parallel to the roadway.

16. The apparatus of claim 13, wherein the controller reduces the point cloud data according to removal of data farther from the roadway than an outer border for the roadway.

17. The apparatus of claim 13, wherein the controller defines a plurality of chunks of the roadway, each chunk having a predetermined length, wherein at least one object described in the point cloud data extends across multiple chunks.

18. The apparatus of claim 13, further comprising:
    a memory comprising occupancy data for the grid arranged in an order that spans multiple dimensions of the grid.

19. The apparatus of claim 13, wherein the controller transforms the grid to the localization geometry according to a transformation matrix or a transformation quaternion.

20. A system for automatic generation of a localization geometry of a roadway, the system comprising:
- a distance sensor configured to receive point cloud data collected by a distance sensor and describing a vicinity of a roadway; and
- a controller configured to reduce the point cloud data to a predetermined volume with respect to the roadway and project the point cloud data to a two-dimensional plane including at least one pixel formation,
- wherein the localization geometry includes a volumetric grid is populated according to a voxel occupancy value for at least one pixel formation.

* * * * *